(12) United States Patent
Woodward

(10) Patent No.: US 8,475,019 B2
(45) Date of Patent: Jul. 2, 2013

(54) HOTSPOT CUTOFF D-OPTIC

(75) Inventor: Ronald O. Woodward, Yorktown, VA (US)

(73) Assignee: Magna International Inc., Aurora, Ontario (CA)

( * ) Notice: Subject to any disclaimer, the term of this patent is extended or adjusted under 35 U.S.C. 154(b) by 304 days.

(21) Appl. No.: 12/433,186

(22) Filed: Apr. 30, 2009

(65) Prior Publication Data
US 2009/0273935 A1 Nov. 5, 2009

Related U.S. Application Data

(60) Provisional application No. 61/126,116, filed on May 1, 2008.

(51) Int. Cl.
*F21V 9/00* (2006.01)

(52) U.S. Cl.
USPC ........... 362/511; 362/509; 362/520; 362/522; 362/555

(58) Field of Classification Search
USPC ................. 362/317, 464, 465, 469, 511, 509, 362/512, 520, 522, 507, 538, 551, 555
See application file for complete search history.

(56) References Cited

U.S. PATENT DOCUMENTS

| | | | |
|---|---|---|---|
| 3,911,430 A | 10/1975 | Jankowski et al. | |
| 5,005,108 A * | 4/1991 | Pristash et al. | 362/602 |
| 5,349,504 A * | 9/1994 | Simms et al. | 362/555 |
| 5,499,166 A * | 3/1996 | Kato et al. | 362/559 |
| 5,555,161 A | 9/1996 | Roe et al. | |
| 5,562,335 A * | 10/1996 | Okuchi et al. | 362/551 |
| 5,575,551 A | 11/1996 | Horii | |
| 5,601,354 A * | 2/1997 | Horii et al. | 362/551 |
| 5,676,445 A * | 10/1997 | Kato | 362/551 |
| 5,685,627 A * | 11/1997 | Kato | 362/551 |
| 5,692,823 A * | 12/1997 | Okuchi | 362/551 |
| 5,772,306 A * | 6/1998 | Okuchi | 361/507 |
| 5,921,671 A * | 7/1999 | Okuchi et al. | 362/511 |
| 6,048,083 A | 4/2000 | McDermott | |
| 6,637,921 B2 | 10/2003 | Coushaine | |
| 6,749,320 B1 | 6/2004 | Hartley | |
| 6,976,770 B2 | 12/2005 | Trimpe et al. | |
| 7,131,759 B2 | 11/2006 | Ishida et al. | |

(Continued)

FOREIGN PATENT DOCUMENTS

| | | |
|---|---|---|
| AT | 008253 U1 | 4/2006 |
| DE | 10062103 | 7/2002 |

(Continued)

*Primary Examiner* — Jong-Suk (James) Lee
*Assistant Examiner* — Bryon T Gyllstrom
(74) *Attorney, Agent, or Firm* — Harness, Dickey & Pierce, P.L.C.

(57) ABSTRACT

The present invention is an optic used for producing a desired beam pattern having a body portion having a height and a thickness, and at least one sidewall profile, as well as an input port for receiving light from a light source. The optic of the present invention also includes an output surface formed as part of the body portion on the opposite side of the body portion in relation to the input port, at least one leg portion formed as part of the body portion, and at least one alignment feature formed as part of the at least one leg portion, the at least one alignment feature for controlling the alignment of the optic in relation to the light source.

16 Claims, 22 Drawing Sheets

U.S. PATENT DOCUMENTS

| | | |
|---|---|---|
| 7,144,121 B2 | 12/2006 | Minano et al. |
| 7,270,447 B2 * | 9/2007 | Goulet et al. ............ 362/327 |
| 7,290,906 B2 * | 11/2007 | Suzuki et al. ............ 362/511 |
| 7,316,495 B2 | 1/2008 | Watanabe et al. |
| 7,329,033 B2 | 2/2008 | Glovatsky et al. |
| 7,560,742 B2 | 7/2009 | Wilson |
| 7,588,359 B2 | 9/2009 | Coushaine et al. |
| 2002/0079506 A1 | 6/2002 | Komoto et al. |
| 2002/0145871 A1 | 10/2002 | Yoda |
| 2003/0058641 A1 | 3/2003 | Watanabe et al. |
| 2004/0008952 A1 | 1/2004 | Kragl |
| 2004/0080938 A1 | 4/2004 | Holman et al. |
| 2004/0149998 A1 | 8/2004 | Henson et al. |
| 2004/0156209 A1 | 8/2004 | Ishida |
| 2004/0218392 A1 | 11/2004 | Leadford |
| 2004/0263346 A1 | 12/2004 | Neal |
| 2005/0018446 A1 | 1/2005 | Ishida |
| 2005/0116635 A1 | 6/2005 | Watson et al. |
| 2006/0087860 A1 | 4/2006 | Ishida |
| 2007/0041207 A1 | 2/2007 | Ishida |
| 2007/0120137 A1 | 5/2007 | Wilson et al. |
| 2007/0127258 A1 | 6/2007 | Wang et al. |
| 2007/0139946 A1 | 6/2007 | Basile et al. |
| 2009/0003009 A1 | 1/2009 | Tessnow et al. |
| 2009/0213606 A1 | 8/2009 | Coushaine et al. |
| 2010/0084667 A1 | 4/2010 | McFadden |
| 2011/0096562 A1 | 4/2011 | Lambert |

FOREIGN PATENT DOCUMENTS

| | | |
|---|---|---|
| DE | 10314256 A1 | 10/2004 |
| DE | 102006020961 A1 | 11/2007 |
| EP | 0769653 A1 | 4/1997 |
| EP | 0678699 | 10/1999 |
| EP | 1213178 | 6/2002 |
| EP | 1357332 A2 | 10/2003 |
| EP | 1873011 A2 | 1/2008 |
| EP | 1923263 | 5/2008 |
| EP | 2039990 A1 | 3/2009 |
| EP | 2113711 A1 | 11/2009 |
| FR | 2797678 | 2/2001 |
| FR | 2855866 | 12/2004 |
| WO | 2006097067 A1 | 9/2006 |
| WO | 2007027474 A2 | 3/2007 |
| WO | WO2007062277 | 5/2007 |
| WO | WO2008089560 | 7/2008 |

* cited by examiner

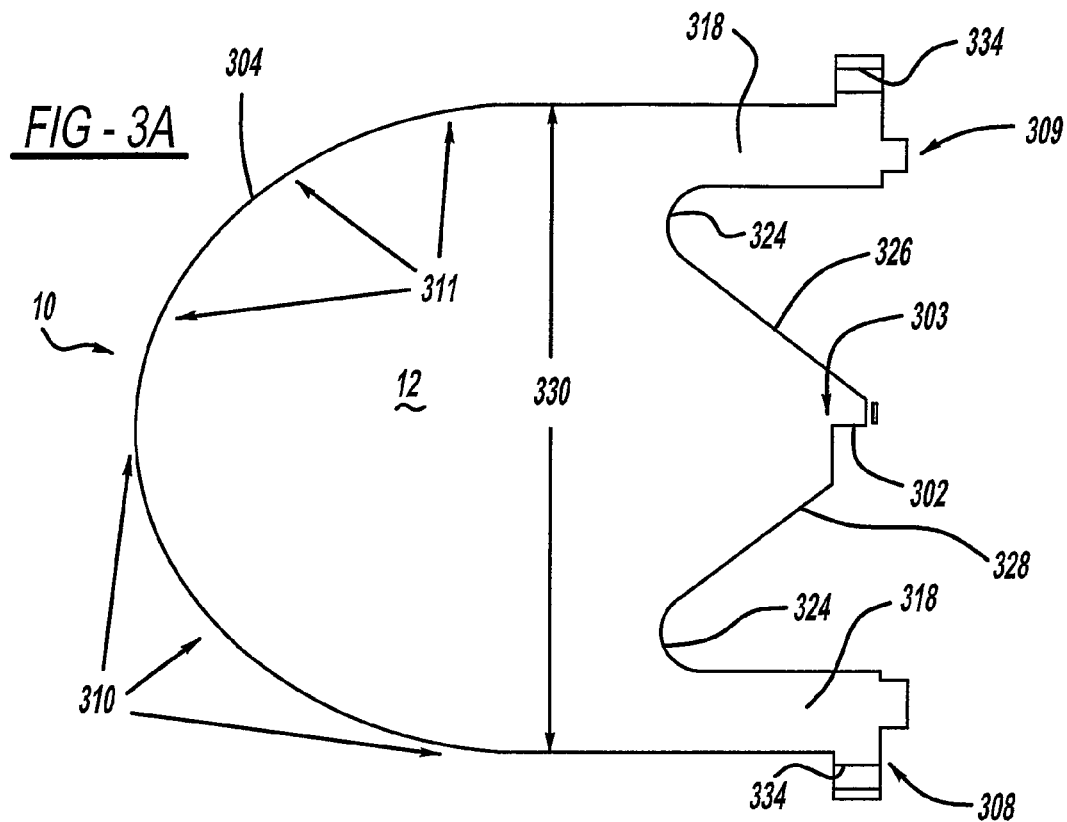
*FIG - 3A*
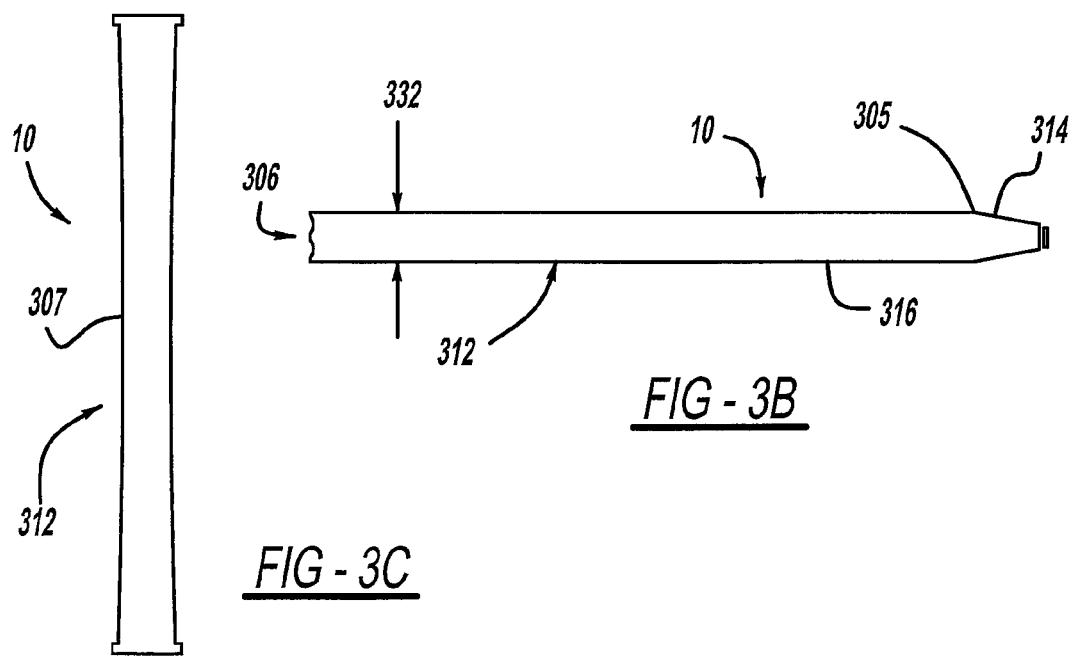
*FIG - 3C*
*FIG - 3B*

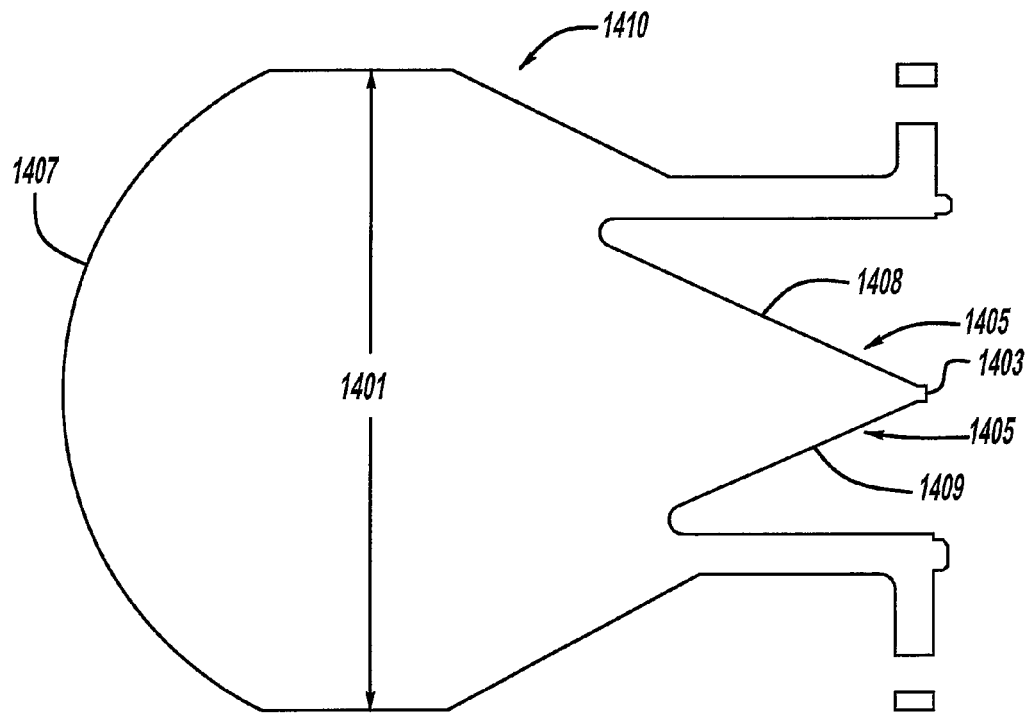
*FIG - 10A*
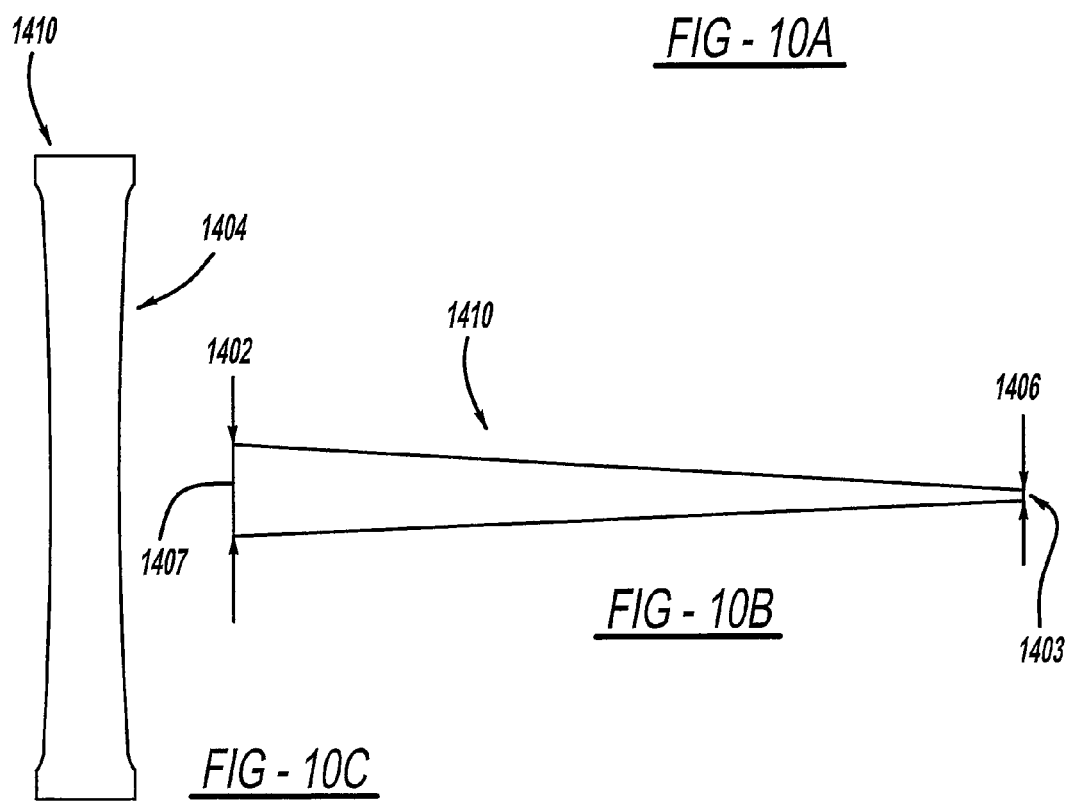
*FIG - 10C*
*FIG - 10B*

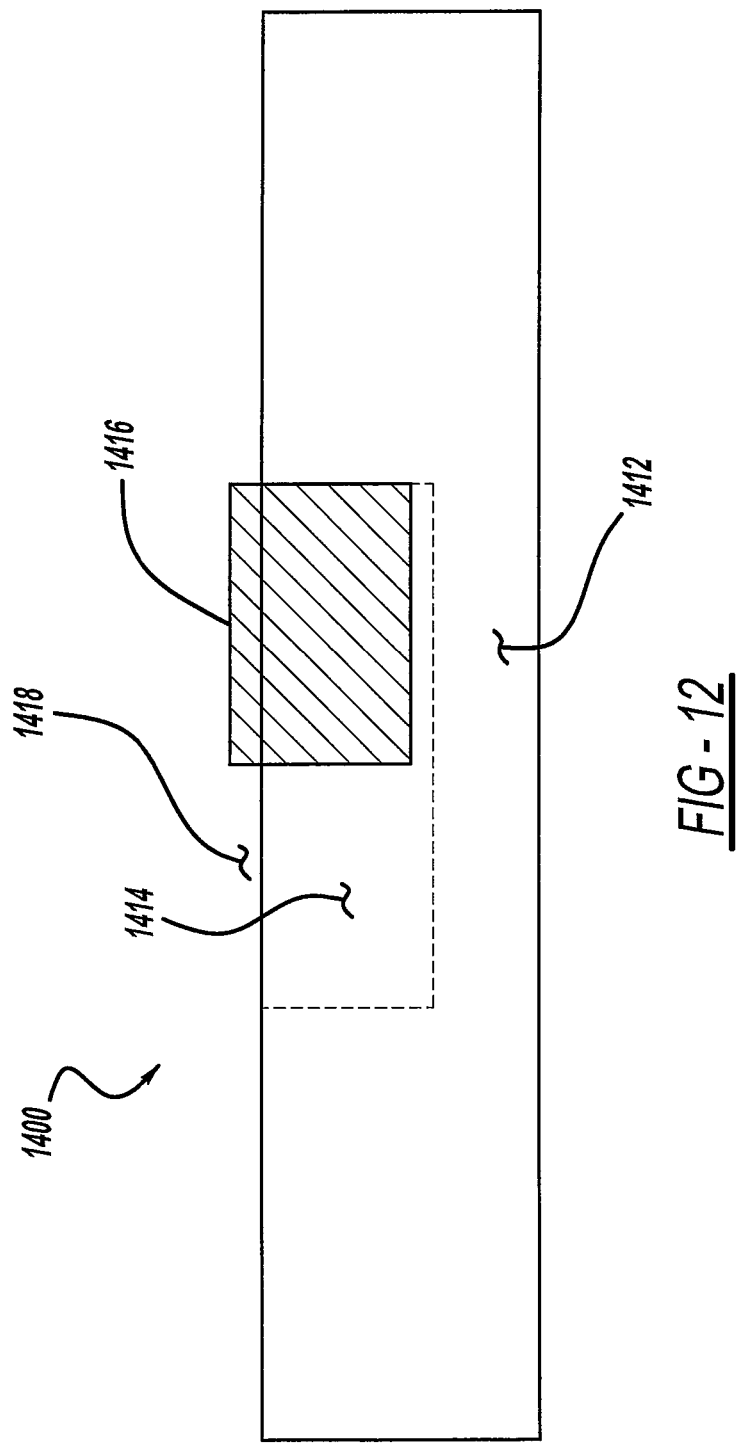

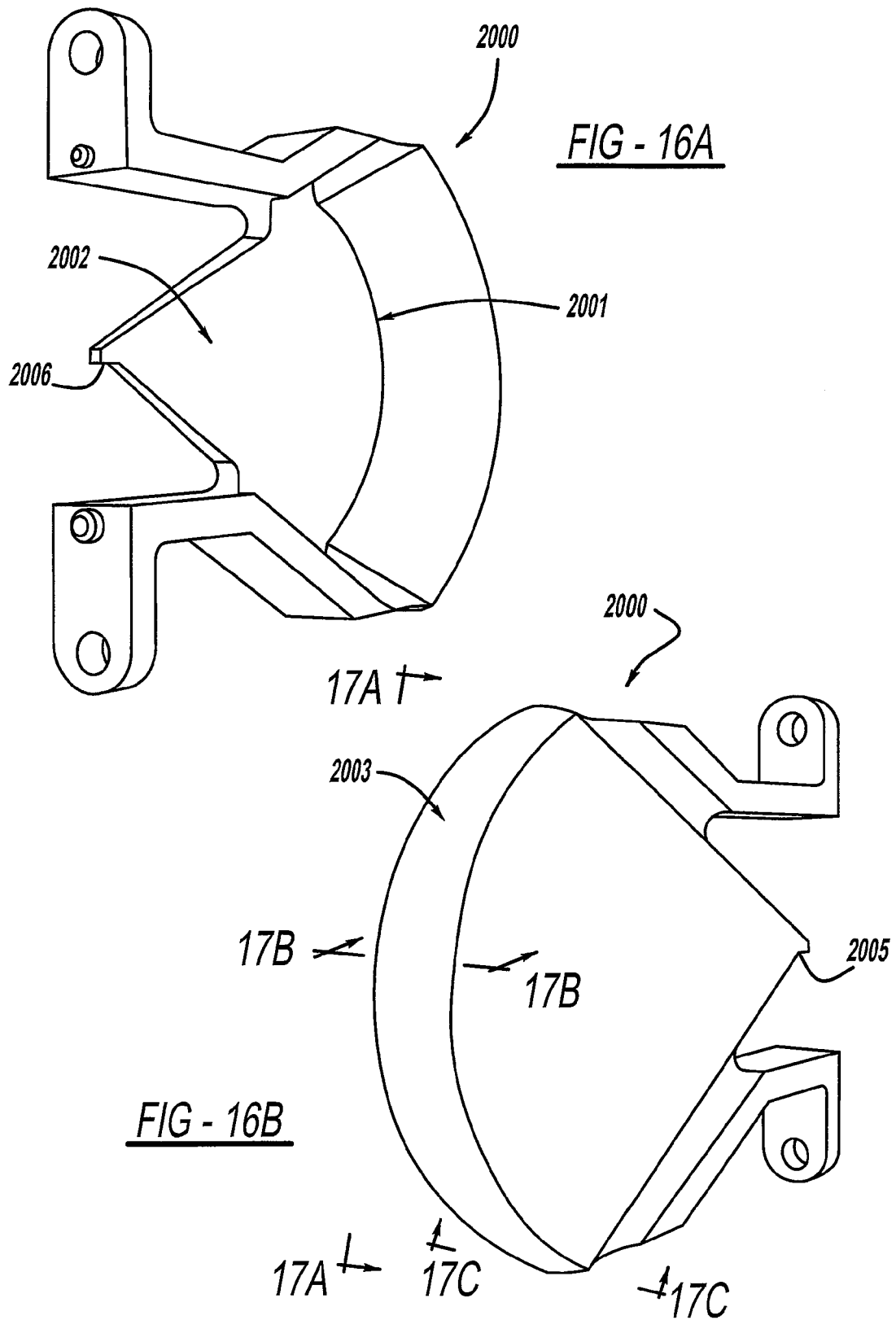

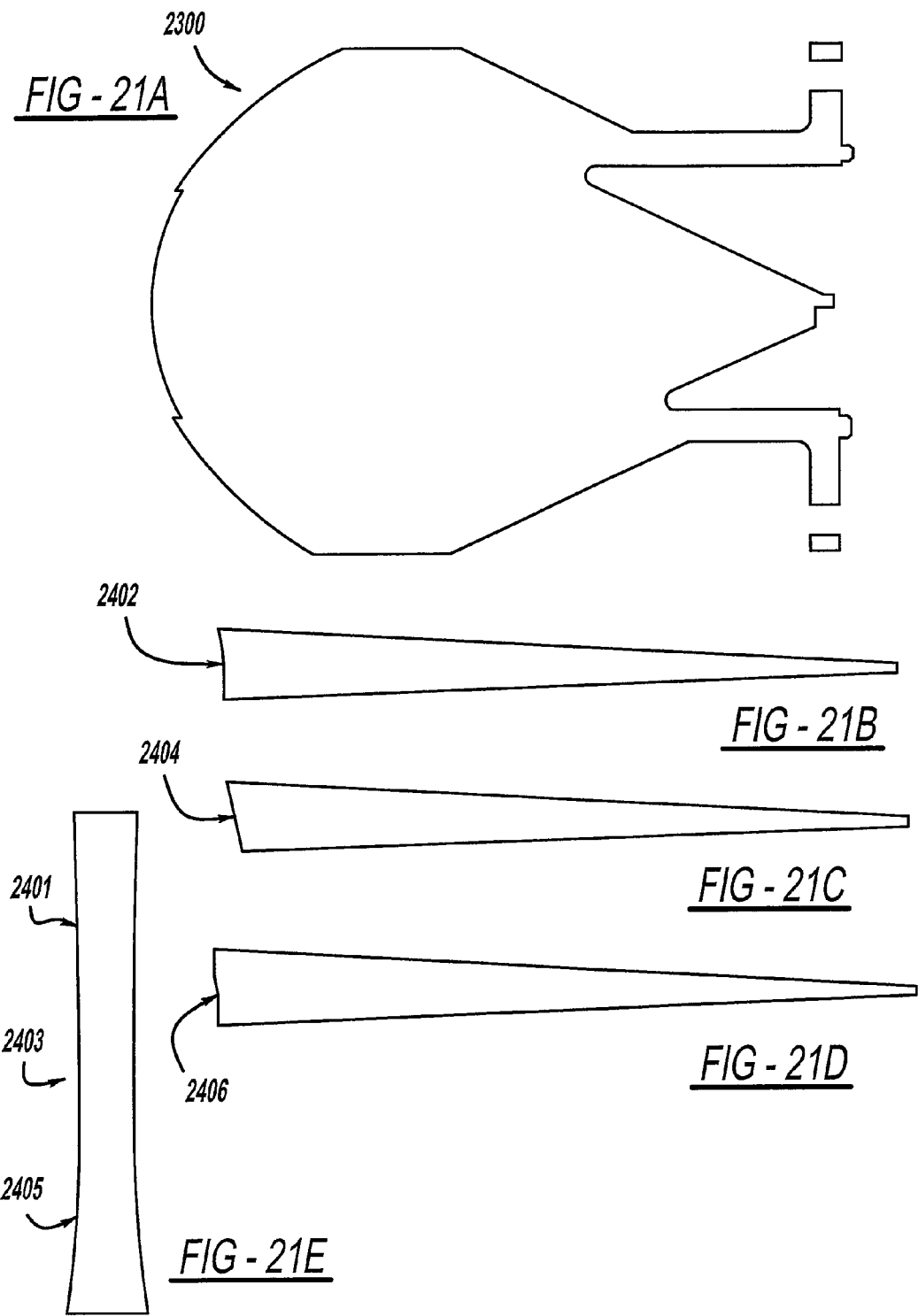

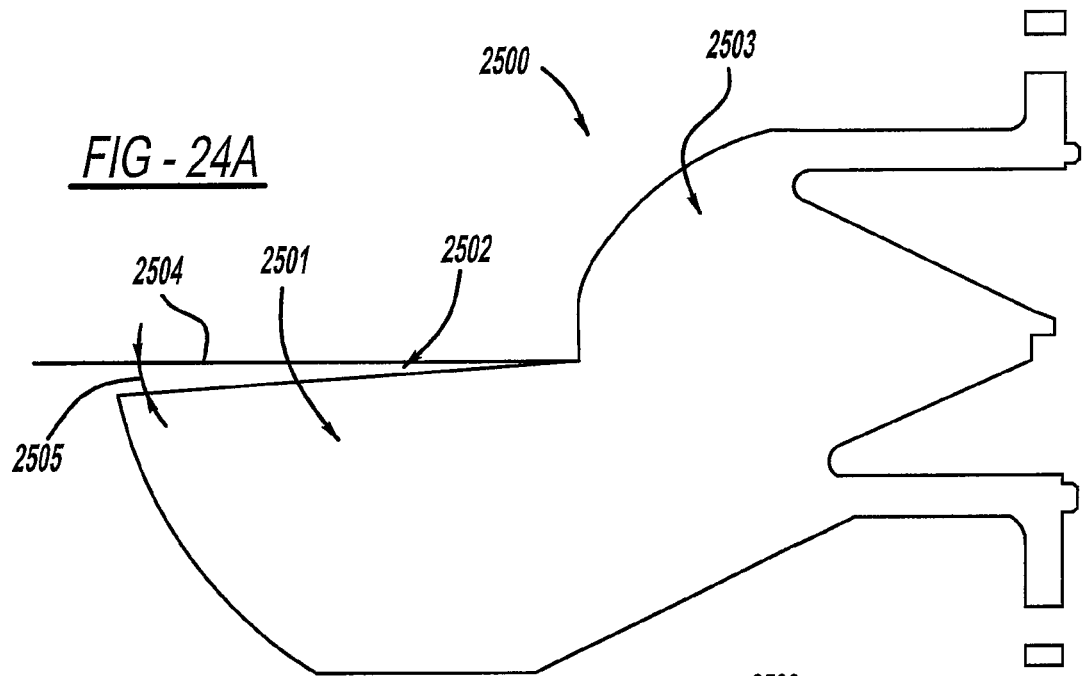
FIG - 24A
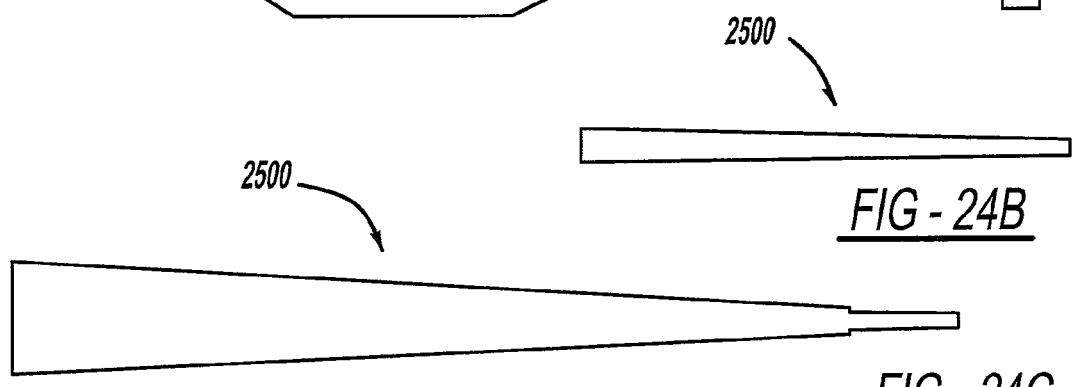
FIG - 24B
FIG - 24C
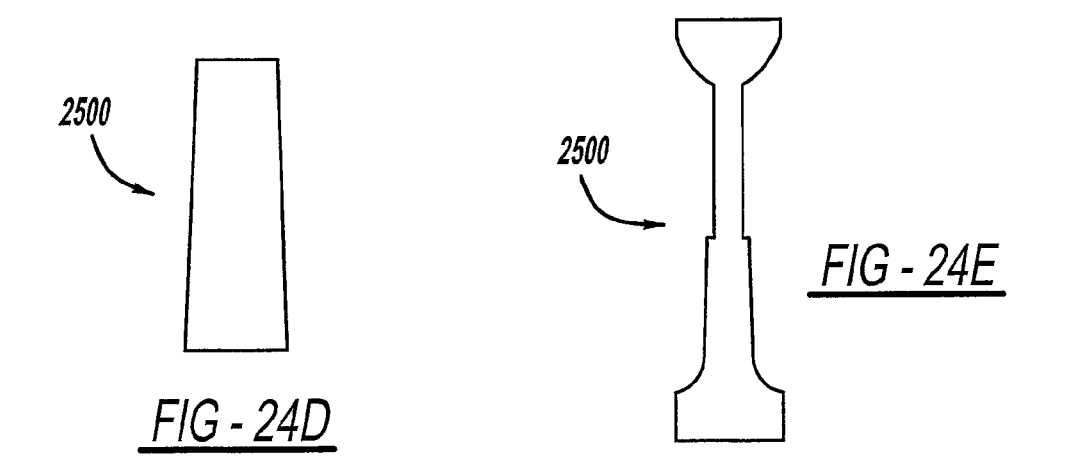
FIG - 24D
FIG - 24E

HOTSPOT CUTOFF D-OPTIC

This application claims the benefits of U.S. Provisional Application No. 61/126,116, filed May 1, 2008.

FIELD OF THE INVENTION

The present invention relates to an optic used for producing various beam patterns, such as spread beam patterns, hot spot beam patterns, bending beam patterns, and combinations thereof.

BACKGROUND OF THE INVENTION

Current light emitting diode (LED) headlamp designs use a projector system to build the high beam hotspot and imaged masks or source shapes to generate the sharp cutoff in the low beam pattern. This is a costly, complex and inefficient solution. Previously we invented an optical element that could produce a wide beam pattern with tall thin optical elements eliminating much of the complexities and providing improved efficiency over projector systems. However, the pattern produced was very wide and smooth, providing insufficient intensity in the center of the pattern; therefore, a projector system was still needed to produce the high beam and low beam hotspots required to achieve a complete beam pattern.

Additionally, when a light source is used to provide light for an input surface, the light from the light source often does not provide light for the entire input surface area. This will often result in a "banding effect," where waves of alternating light and dark area will be seen in the resulting beam pattern.

Another difficulty which arises in the production of optics is that there are certain requirements which must be met with regard to glare from a headlamp directed towards a driver's eyes when two vehicles are approaching each other from opposite directions. Headlamps need to accommodate for this glare, and must not produce light in certain glare test points which represent the oncoming driver's eye location.

Accordingly, there exists a need for a lighting device which overcomes the aforementioned problems.

SUMMARY OF THE INVENTION

The present invention solves the intensity and cutoff problems of typical optics by using an optic with a tall, thin profile having specific characteristics that allow the production of higher maximum intensities required for a high beam pattern. The optic of the present invention also provides sufficiently sharp horizontal gradients needed for a low beam pattern, which is required for good photometric and on road performance. The present invention also seeks to develop tall, thin optics that can efficiently deliver high intensity light, and can also be used to form the required shapes in the headlamp beam pattern.

The present invention is an optic used for producing a desired beam pattern with a body portion having a height and a thickness, and at least one sidewall profile, as well as an input port for receiving light from a light source. The optic of the present invention also includes an output surface formed as part of the body portion on the opposite side of the body portion in relation to the input port, at least one leg portion formed as part of the body portion, and at least one alignment feature formed as part of the at least one leg portion, the at least one alignment feature for controlling the alignment of the optic in relation to the light source.

A first embodiment of the present invention includes a curved output surface, and specially shaped top, bottom, and side walls. A series of sloped, planar walls near the input port coupled with the thin crossection combine to create a smooth, wide horizontal light pattern having a sharp, controllable gradient in the vertical direction, and a smooth exponential pattern fade out below horizontal to the deep foreground. This optic is used to create fog lamp beams, or the wide spread portion of headlamp beam patterns. If needed, the smoothness of the pattern can be improved by applying a horizontal wave function to the output surface. A slight variation of this optic which is designed to produce an inverted cutoff pattern is combined with the first optic to provide a high beam spread pattern.

A second embodiment of the present invention is an optic which is thicker and taller, having different and specially shaped top, bottom, and side walls. These changes allow a single LED to produce a much higher (approximately 10 times higher) maximum intensity compared to the optic described in the first embodiment. The optic of this embodiment provides the high intensity portion of a high beam headlamp pattern.

A third embodiment of the present invention is an optic that has features similar to those of the first and second optics combined, but without the small, planar surfaces near the input port. These features create a high intensity pattern, having a horizontal cutoff with a high vertical gradient and smooth foreground blending. This optic can be used to provide a portion of the lowbeam hotspot or supplemental lighting that improves illumination around curves.

A fourth embodiment of the present invention is an optic which combines the features of the third embodiment with additional features that allow it to produce a high intensity pattern that fills only one quadrant (when the beam is projected onto a graph) by producing relatively sharp gradients in both the horizontal and vertical directions, and is combined with the third optic to create an improved low beam hotspot pattern.

A fifth embodiment of the present invention is an optic which combines features of the third embodiment with different features to produce a beam pattern that is similar to that produced by the combination of the third and fourth embodiments, having both a horizontal spread with vertical cutoff and a stepped pattern with a horizontal cutoff.

A sixth embodiment of the present invention is an optic that combines features of the fifth optic with additional features, making it possible to create a complete low beam pattern with a single optic. In all cases, multiple devices will be required until the optical output of a single LED is sufficient to produce a low beam pattern of sufficient intensity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a sectional side view taken along lines 3A-3A of FIG. 2;

FIG. 3B is a top sectional view taken along lines 3B-3B of FIG. 2;

FIG. 3C is a sectional front view taken along lines 3C-3C of FIG. 2;

FIG. 10A is a sectional side view taken along lines 10A-10A of FIG. 9B;

FIG. 10B is a sectional top view taken along lines 10B-10B of FIG. 9B;

FIG. 10C is a sectional top view taken along lines 10C-10C of FIG. 9B;

FIG. 12 is a low beam pattern divided up into sections used to produce an optic, according to a first embodiment of the present invention;

FIG. 16A is a first perspective view of an optic, according to a fifth embodiment of the present invention;

FIG. 16B is a second perspective view of an optic, according to a fifth embodiment of the present invention;

FIG. 21A is a sectional side view taken along lines 21A-21A of FIG. 20B;

FIG. 21B is a first sectional top view of an optic taken along lines 21B-21B of FIG. 20B;

FIG. 21C is a second sectional top view taken along lines 21C-21C of FIG. 20B;

FIG. 21D is a third sectional top view taken along lines 21D-21D of FIG. 20B;

FIG. 21E is a sectional front view taken along lines 21E-21E of FIG. 20B;

FIG. 24A is a sectional side view taken along lines 24A-24A of FIG. 23B;

FIG. 24B is a first sectional top view taken along lines 24B-24B of FIG. 23B;

FIG. 24C is a second sectional top view taken along lines 24C-24C of FIG. 23B;

FIG. 24D is a first sectional front view taken along lines 24D-24D of FIG. 23B;

FIG. 24E is a second sectional front view taken along lines 24E-24E of FIG. 23B;

DETAILED DESCRIPTION OF THE PREFERRED EMBODIMENTS

The following description of the preferred embodiment(s) is merely exemplary in nature and is in no way intended to limit the invention, its application, or uses.

Figure 1:
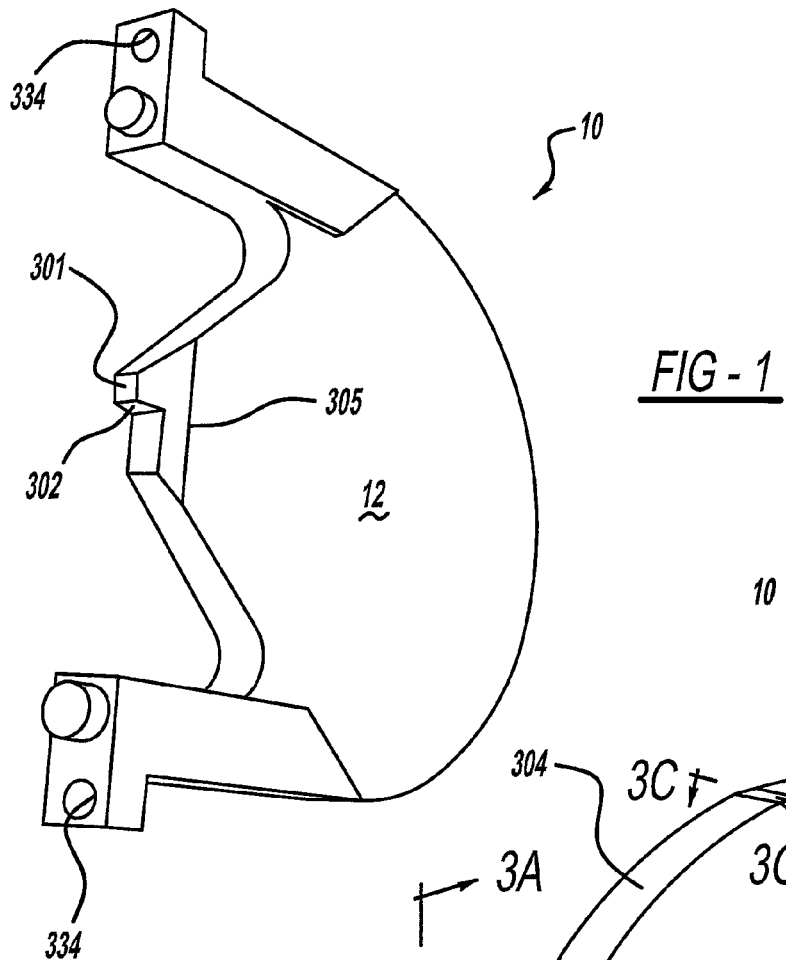
FIG. 1 is a first perspective view of an optic, according to a first embodiment of the present invention.
Figure 2:
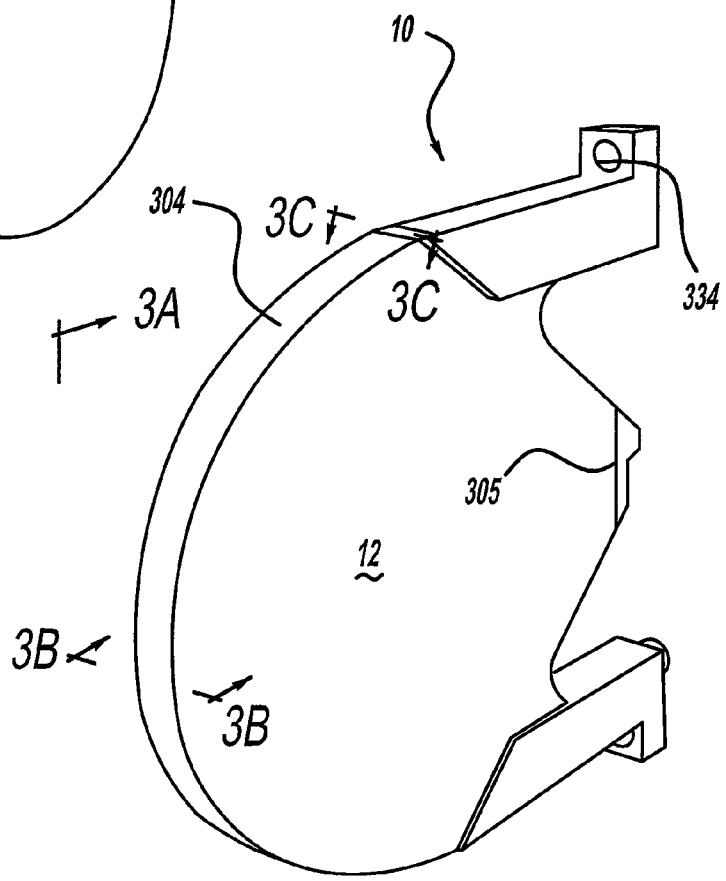
FIG. 2 is a second perspective view of an optic, according to a first embodiment of the present invention.
Figure 4:
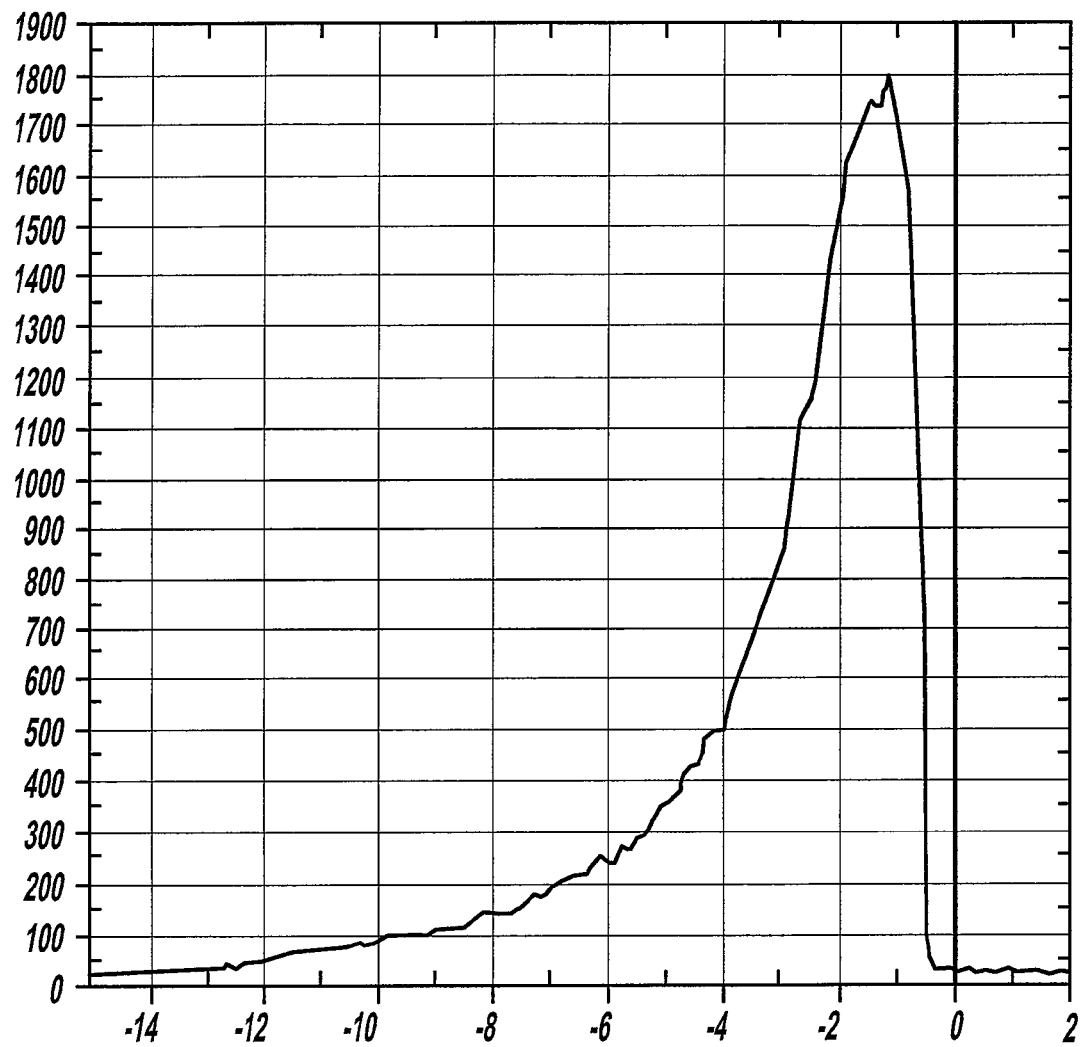
FIG. 4 is a graph depicting a vertical cross-section of the beam pattern produced by an optic according to a first embodiment of the present invention.
Figure 5:
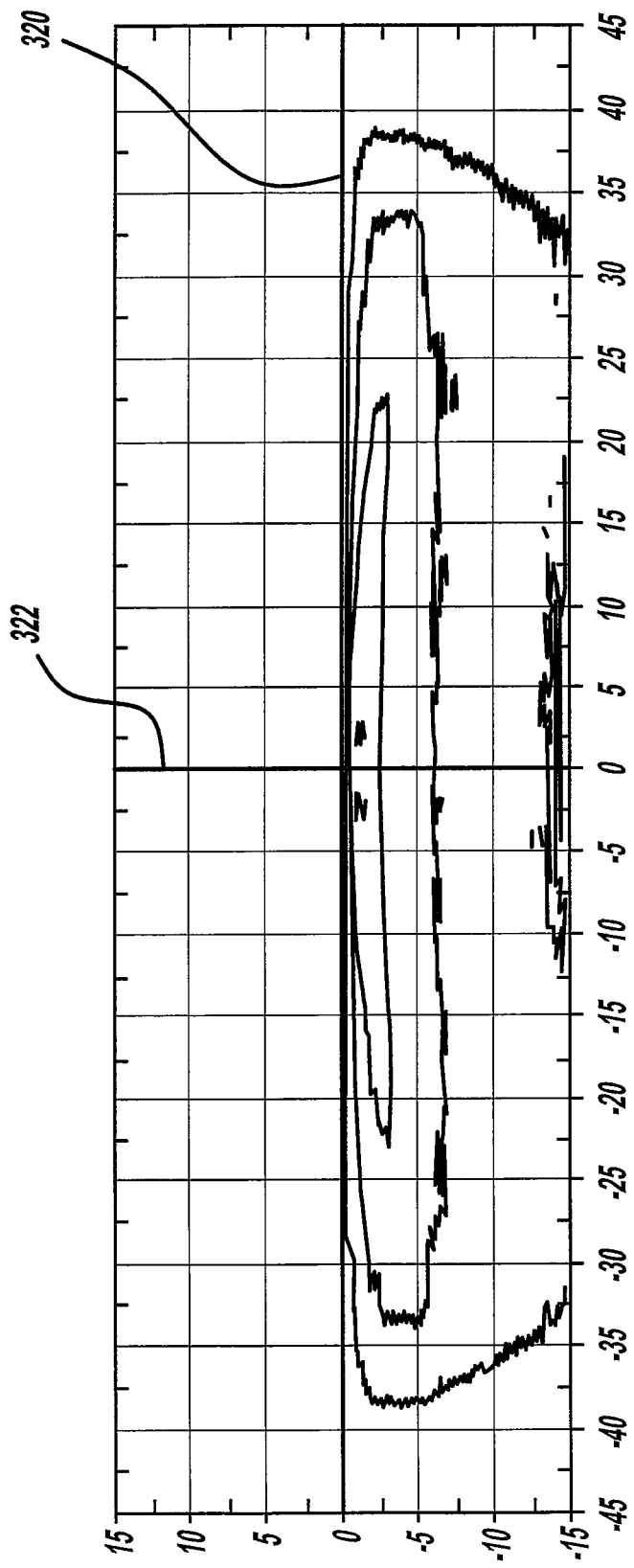
FIG. 5 is a beam pattern produced by an optic, according to a first embodiment of the present invention.
Figures 6A, 6B:
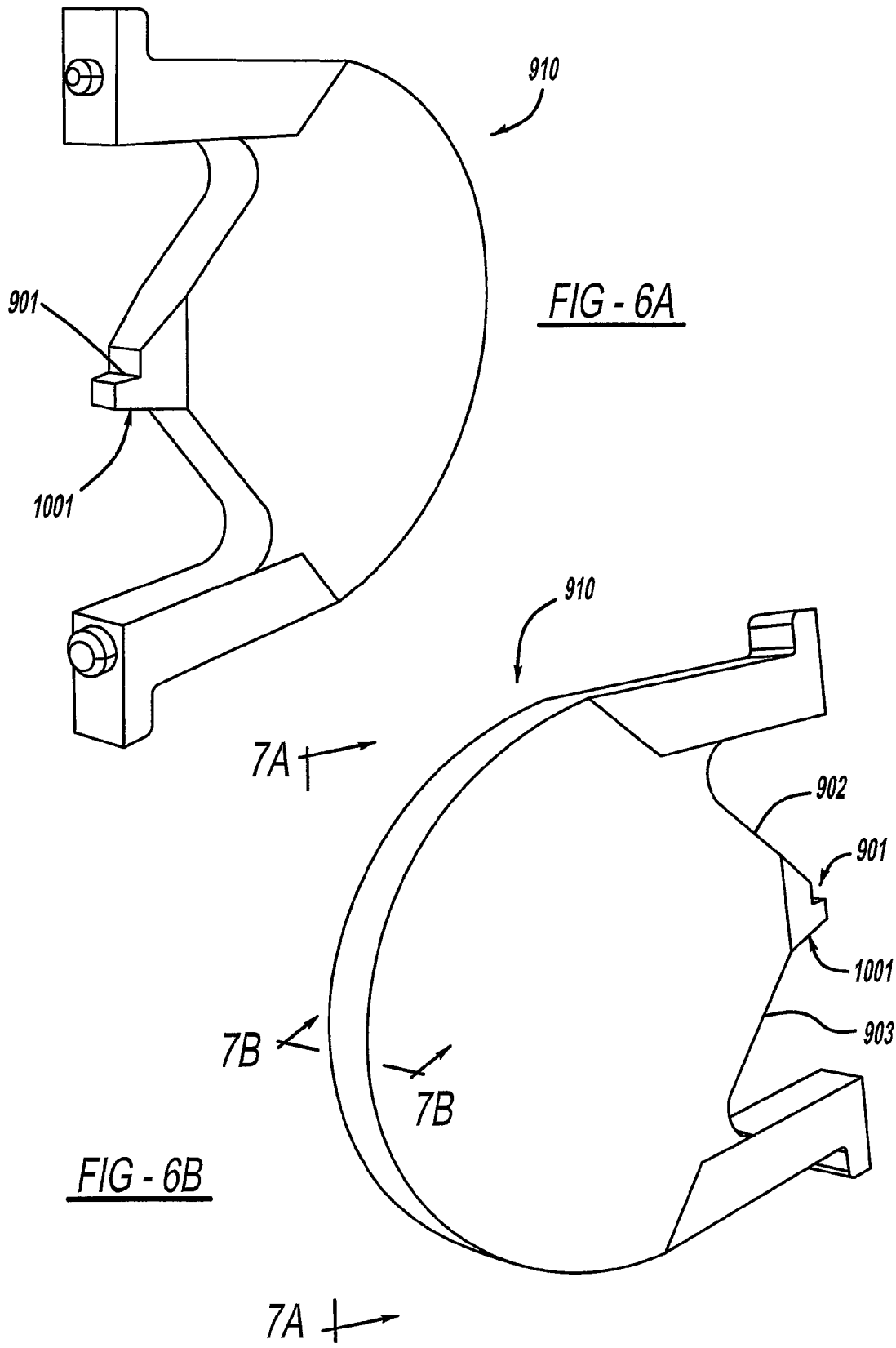
FIG. 6A is a first perspective view of an optic, according to a second embodiment of the present invention.
FIG. 6B is a second perspective view of an optic, according to a second embodiment of the present invention.
Figure 7A:
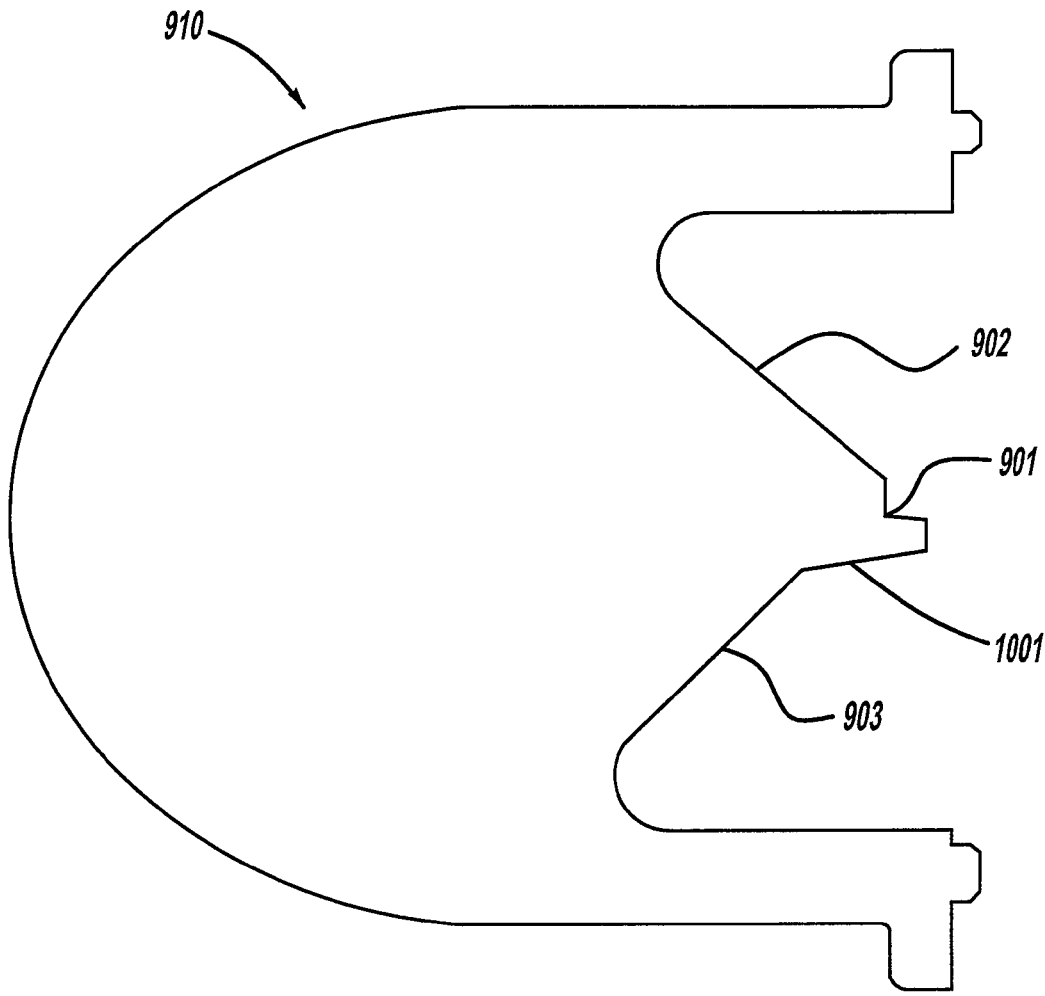
FIG. 7A is a sectional side view taken along lines 7A-7A of FIG. 6B.
Figure 7B:
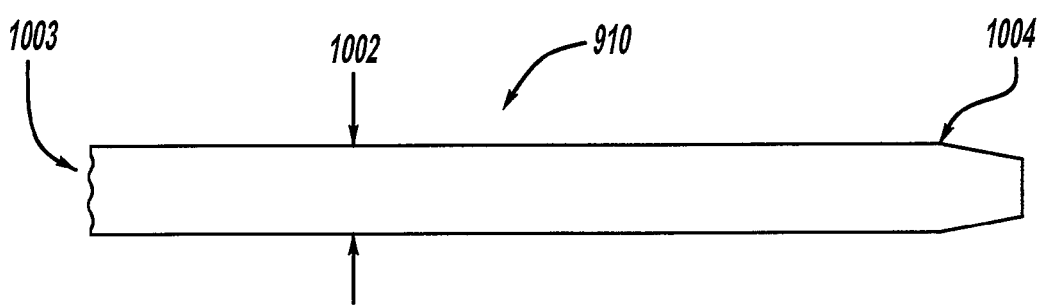
FIG. 7B is a sectional top view taken along lines 7B-7B of FIG. 6B.

A first embodiment of an optic according to the present invention is shown in FIGS. 1, 2, and 3A-3C generally at 10. The optic 10 is configured to be a low beam spread optic. The optic 10 has several new features that improve on and eliminate the problems with the prior art. Light is received into the optic 10 from a light emitting diode, or LED (not shown) directly coupled to the body 12 of the optic 10 through an input port 301, shortening the light path and improving optical efficiency. The optic 10 also includes a wall 302 and an output surface 304 having a shape so as to focus the light near a notch 303, forming a smooth, blended foreground pattern as shown in FIG. 5, and by the vertical cross-section of the pattern, which is shown in FIG. 4. The patterns shown in FIG. 4 are achieved with greatly reduced sensitivity of the pattern to LED alignment in relation to the optic 10.

The horizontal distribution of the output light of the optic 10 is also alternatively controlled by placement of a bend, or "kink" 305 in the side wall, shown generally at 312, between tapered section 314 and essentially straight section 316. When the kink 305 is located near the input port 301, this results in a wider, more distributed, output pattern. When the kink 305 is located near or extended to the output surface 304, a pattern is produced which concentrates more light in the middle of the pattern. The flatness of the top portion of the beam pattern is controlled by changing the profile 307 of the sidewall 312; a thinner section in the center of the profile 307 of the sidewall 312 serves to flatten the outboard ends of the pattern as shown in FIG. 5. The graph as shown in FIG. 5 includes a horizontal cut off line 320, and a vertical cut off line 322.

The optic 10 also includes a bottom half 310, and a top half 311. The sidewalls 312 are substantially perpendicular to the output surface 304. The optic 10 also has two leg portions 318 which are attached to two LED alignment features 308,309. The leg portions 318 also include a curved profile section 324, one of which extends into a first lower wall portion 326 and a second lower wall portion 328. The curved profile section 324 helps to improve the strength of the optic 10. Each leg portion 318 also optionally includes an aperture 334, where a fastener (not shown) such as a screw will extend through the aperture 334 to secure the optic 10 to a desired surface. It is also within the scope of the invention that the leg portions 318 may also be clamped down to a desired surface, or the optic 10 may be attached to the desired surface through the use of snap features.

The optic 10 also includes a height 330 and a thickness 332 which are adjusted to achieve the desired beam pattern. In this embodiment, the height 330 is 40 mm, and the thickness 332 is 3.4 mm.

Asymmetric shaping of the sidewall profile 307 can be used to achieve the sloped pattern for ECE beam patterns. The configuration of the optic 10 as shown in FIGS. 1-3C allows for the addition of the precise LED alignment features 308, 309. The LED alignment feature 308 controls height above the LED and, the LED alignment feature 309 controls alignment over the LED. Improved horizontal smoothness is achieved by adding a multi-cycle wave 306, which for example can be in the form of a sinusoidal wave or tangential arcs having various numbers of cycles, to the profile of the output surface 304. A "cycle" is defined as one complete alternating variation in the pattern of the wave. For example, if a sinusoidal wave were used, one cycle would be the completion of $2\pi$ radians. The multi-cycle wave 306 will reduce the "banding effect" (alternating bright and dark areas of light) which can occur when using various types of optics. The wave 306 as shown in FIG. 3C is a two-cycle wave, and extends only along the top half 311 of the optic 10. Extending the wave 306 from the top to the bottom of the optic 10 reintroduces undesirable light above the horizontal line 320 of the desired beam pattern shown in FIG. 5. By eliminating or reducing the waves from the bottom half, generally shown at 310, of the optic 10, any undesirable light above the horizontal line 320 is eliminated. The multi-cycle wave 306 in this embodiment is also a two-cycle wave, meaning that two complete cycles were used to create the wave 306.

Figure 8:
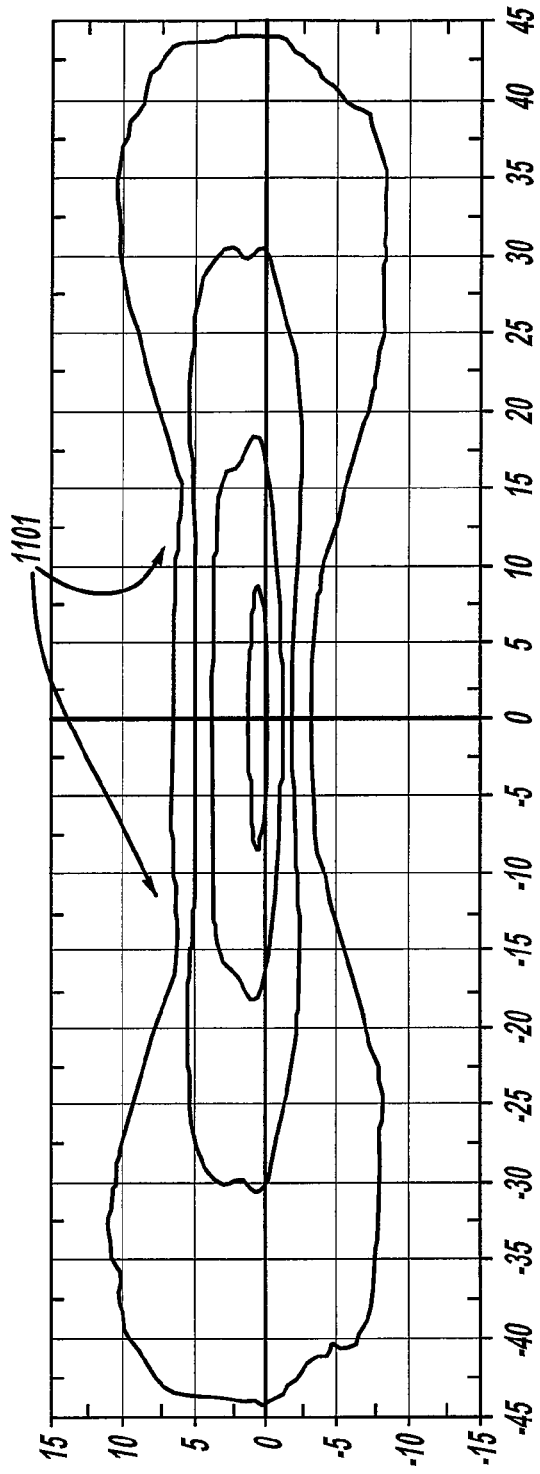
FIG. 8 is a projected beam pattern produced by an optic, according to a second embodiment of the present invention.

FIGS. 6A-7B show the configuration for another embodiment of the present invention in the form of a high beam spread optic 910. This embodiment of the optic 910 includes similar features to the optic 10 previously described, but is configured for having a high beam spread pattern, as shown in FIG. 8. This embodiment includes a notch 901, which is inverted compared to the notch 303 of the low beam spread optic 10 shown in FIGS. 1 and 2. This inversion creates a pattern having a cutoff on the bottom of the pattern. This embodiment also includes a first lower wall portion 902 and a second lower wall portion 903, as with the previous embodiment; however, part of the second lower wall portion 903 includes and angled portion 1001, which has been made shallower that the second lower wall portion 328 as compared to the optic 10 in FIGS. 1 and 2. Introducing the angled portion 1001 into the second lower wall portion 903 redirects light that would have been ineffective below the area indicated generally at 1101 in FIG. 8, into the useful pattern as shown in FIG. 8. Similar features are optionally employed in the optic 910 that are shown are part of the low beam optic 10 shown in FIGS. 1 and 2. A narrower pattern is produced by increasing the thickness 1002 of the optic 910. Improved smoothness is achieved in the optic 910 with a three-cycle output wave 1003, as opposed to a two-cycle output wave. Additionally, because the thickness 1002 of the optic 910 has changed, the position of the kink 1004 has changed as well.

Figure 11:
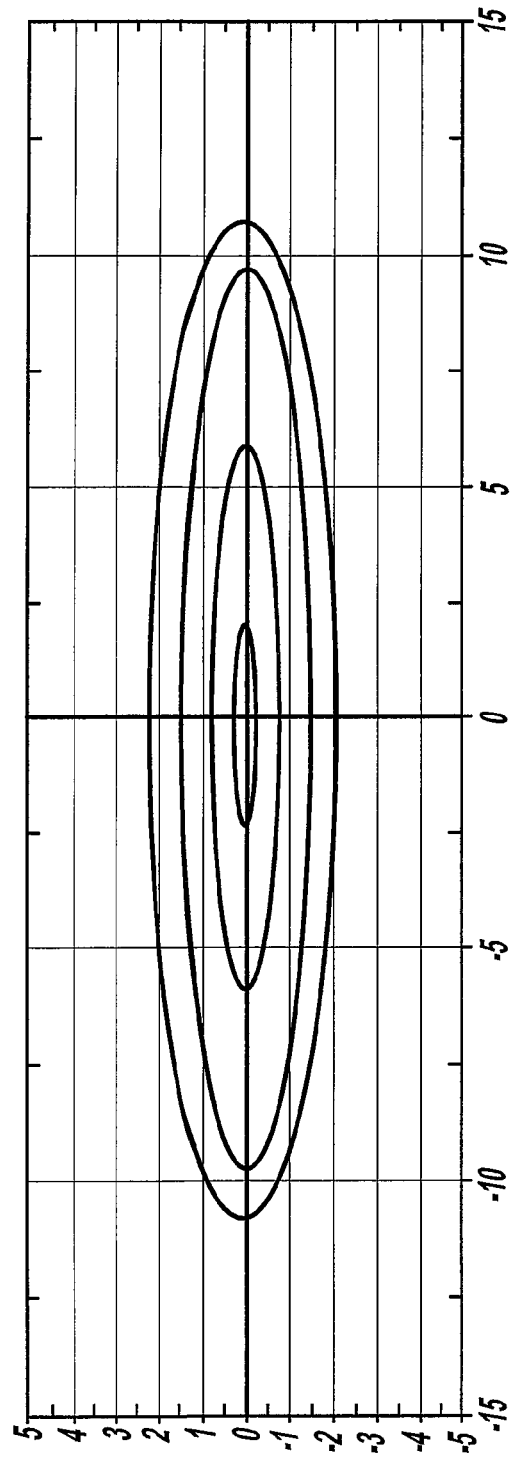
FIG. 11 is a projected beam pattern produced by an optic, according to a third embodiment of the present invention.
Figure 9A:
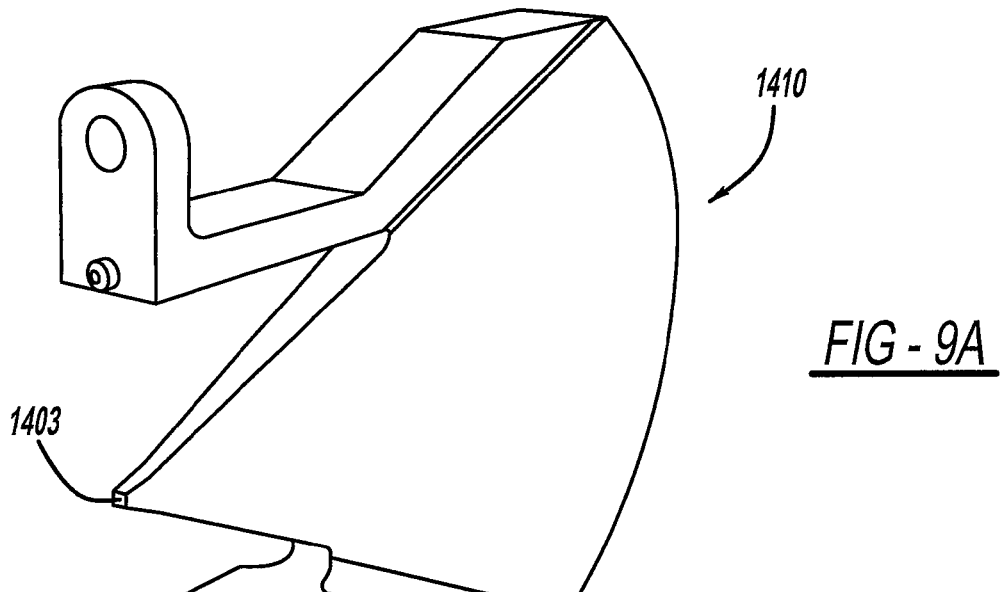
FIG. 9A is a first perspective view of an optic, according to a third embodiment of the present invention.
Figure 9B:
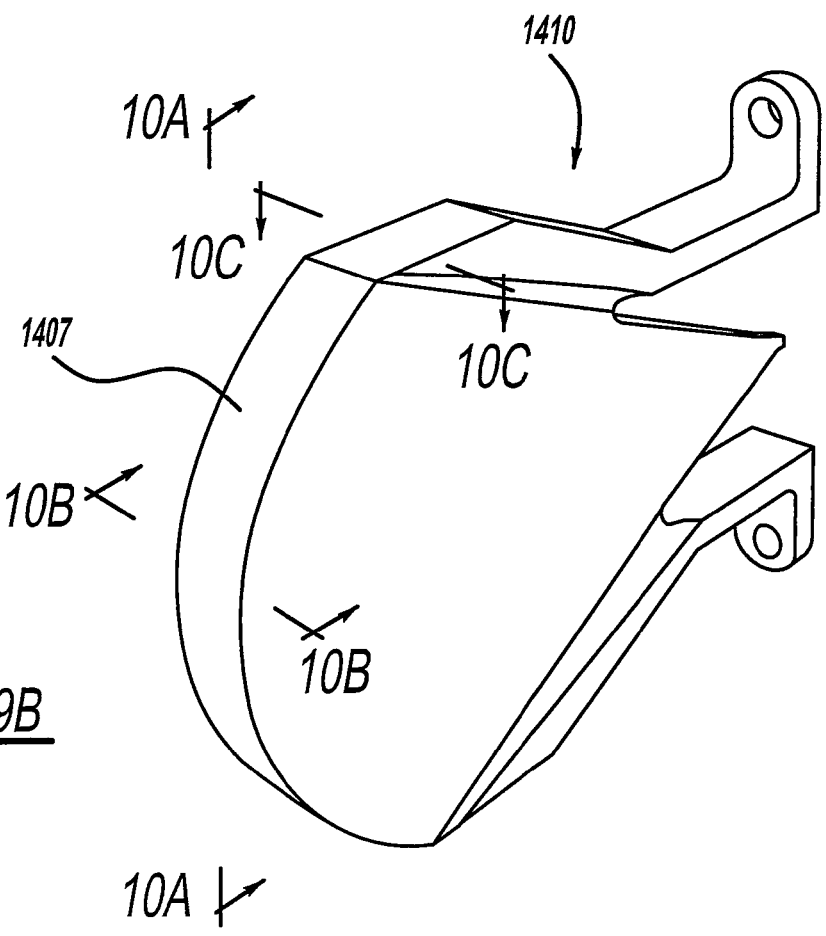
FIG. 9B is a second perspective view of an optic, according to a third embodiment of the present invention.
Figure 13A:
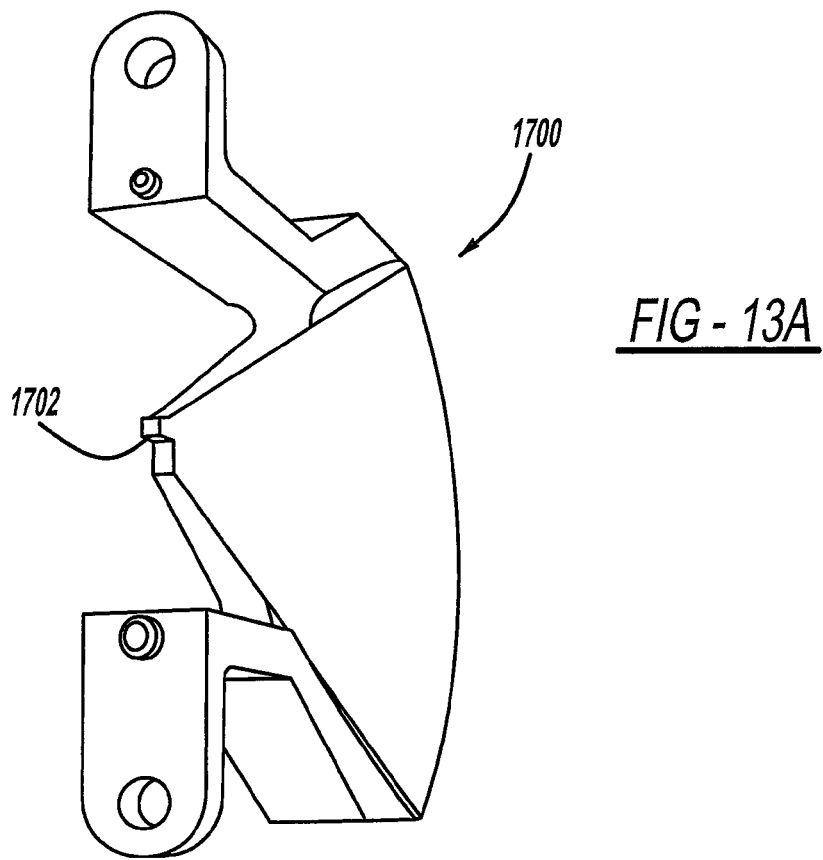
FIG. 13A is a first perspective view of an optic, according to a fourth embodiment of the present invention.
Figure 13B:
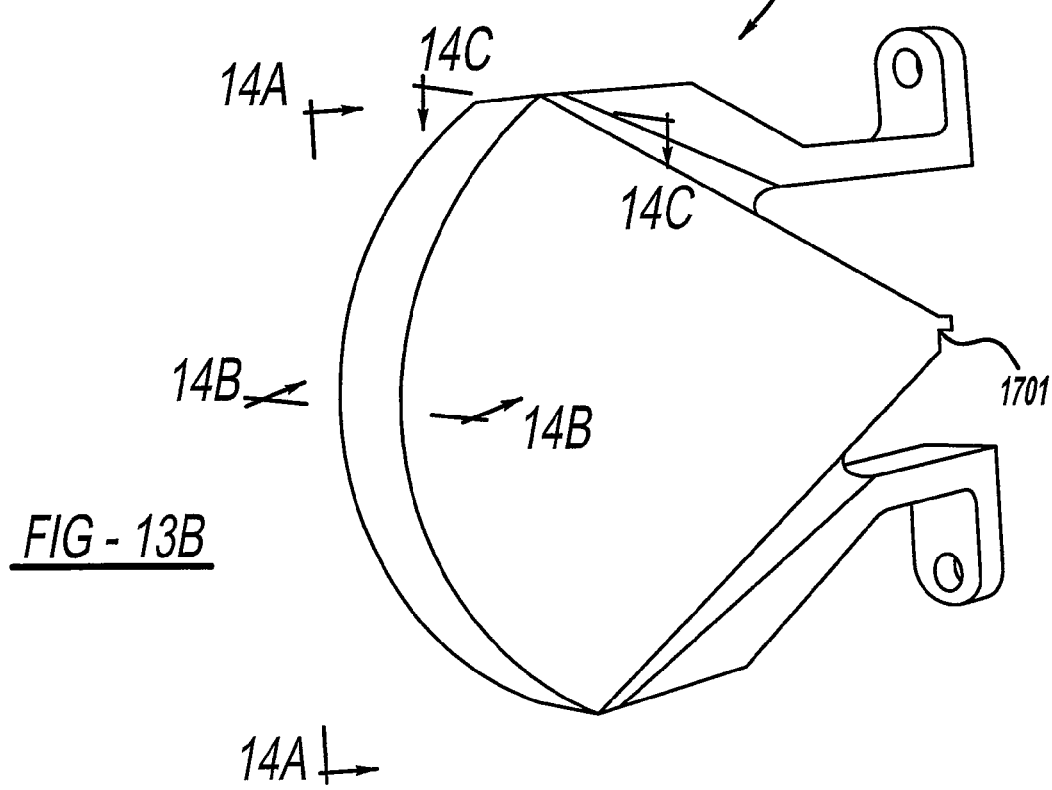
FIG. 13B is a second perspective view of an optic, according to a fourth embodiment of the present invention.
Figure 14A:
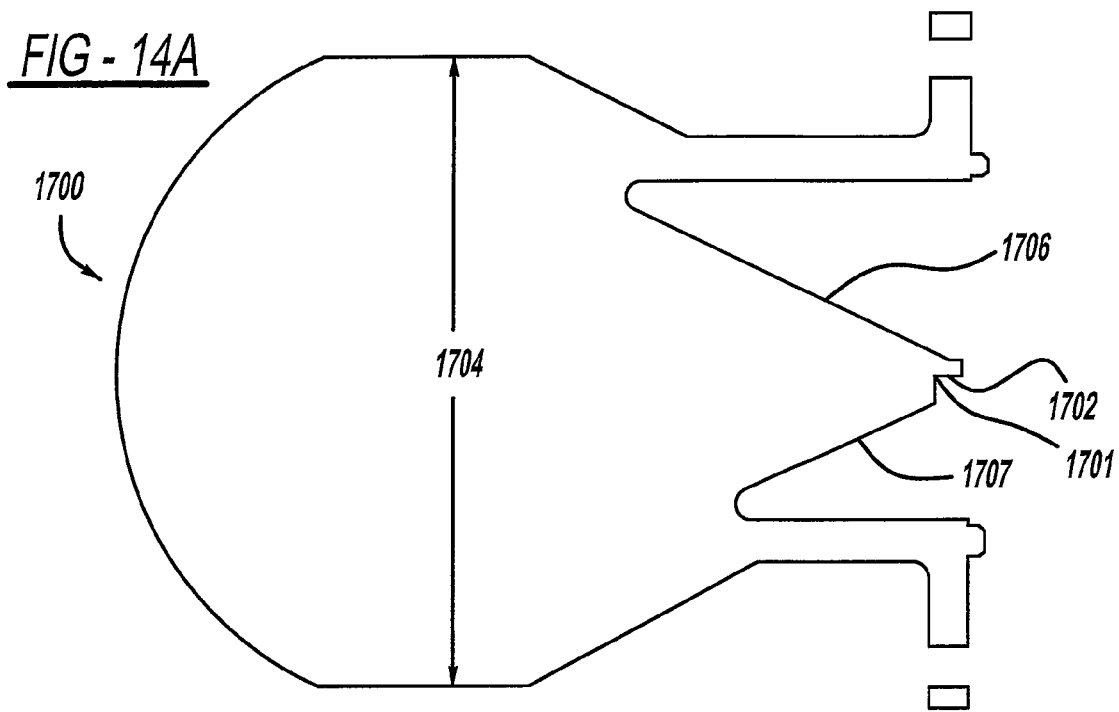
FIG. 14A is a sectional side view taken along lines 14A-14A of FIG. 13B.
Figure 14B:
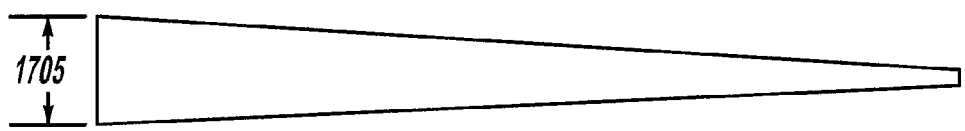
FIG. 14B is a sectional top view taken along lines 14B-14B of FIG. 13B.
Figure 14C:
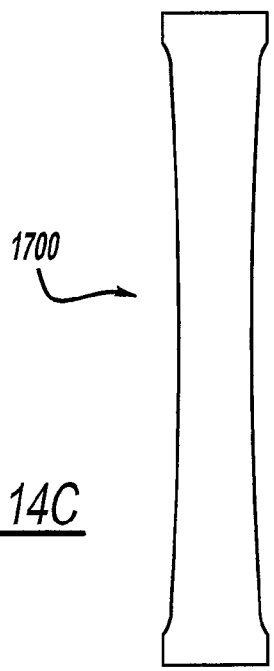
FIG. 14C is a sectional front view taken along lines 14C-14C of FIG. 13B.

FIG. 9A through 10C show an optic generally at 1410 used form producing a high beam hot spot optic 1410 to achieve higher maximum intensity for use in headlamp high beam applications. Achieving theses higher levels of performance requires increasing the size of the optic 1410. The optic height 1401 is increased to 66 mm (from an optic height 330 of 40 mm described in the optic 10), and the thickness 1402 is increased to 10 mm (from a thickness 332 of 3.4 mm described in the optic 10). The optic 1410 also includes an input port 1403, similar to the previous embodiments. However the width 1406 of the input port 1403 is decreased to 1.2 mm. The width 1406 of the input port 1403 and the thickness 1402 of the output surface 1407 have a significant influence on the pattern of the beam produced. If the width 1406 of the input port 1403 remains constant and the width 1402 of the output surface 1407 is increased, a narrower beam pattern is produced. However, if the width 1402 of the output surface 1407 remains constant and the width 1406 of the input port 1403 is increased, a wider beam pattern is produced. Also, in this embodiment, the curved side profile 1404 of the optic 1410 as shown in FIG. 14C is adjusted to produce the highest intensity across the center of the optic 1410. The optic 1410 also has first and second lower wall portions 1408,1409 which have a hyperbolic profile 1405, which improves the maximum intensity. The resulting output pattern is shown in FIG. 11. Maximum intensity produced by this optic 1410 is approximately ten times that produced by the spread optics 10,910.

The low beam pattern, shown generally at 1400 in FIG. 12, produced by the spread optics 10 is broken up into several parts. The pattern 1400 includes a spread portion 1412, a hot spot portion 1414, and a hot spot cutoff portion 1416. Other embodiments of the invention discussed below act to reduce or modify the hot spot cutoff portion 1416. There is also an area indicated at 1418 which is a test point area 1418. The embodiments discussed below also act to reduce or eliminate light produced in the test point area 1418 such, which is required to be below a maximum value to be used for passenger vehicles.

Figure 15:
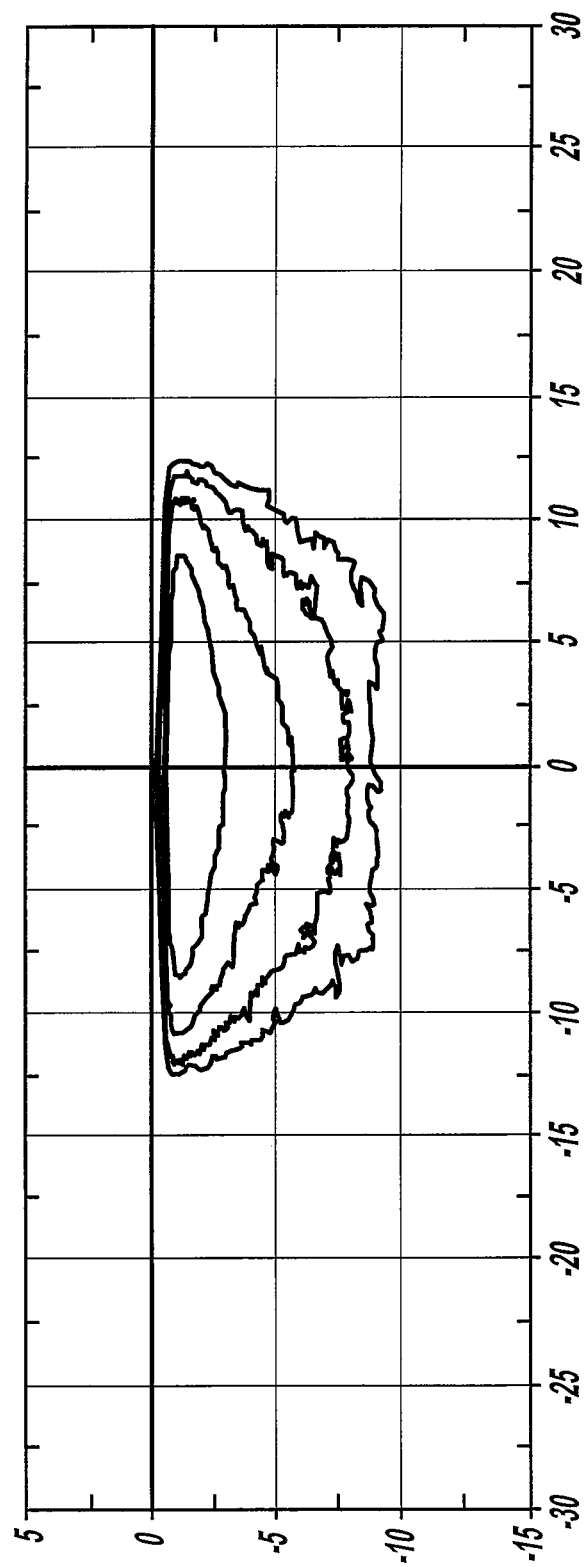
FIG. 15 is a projected beam pattern produced by an optic, according to a fourth embodiment of the present invention.
Figure 17A:
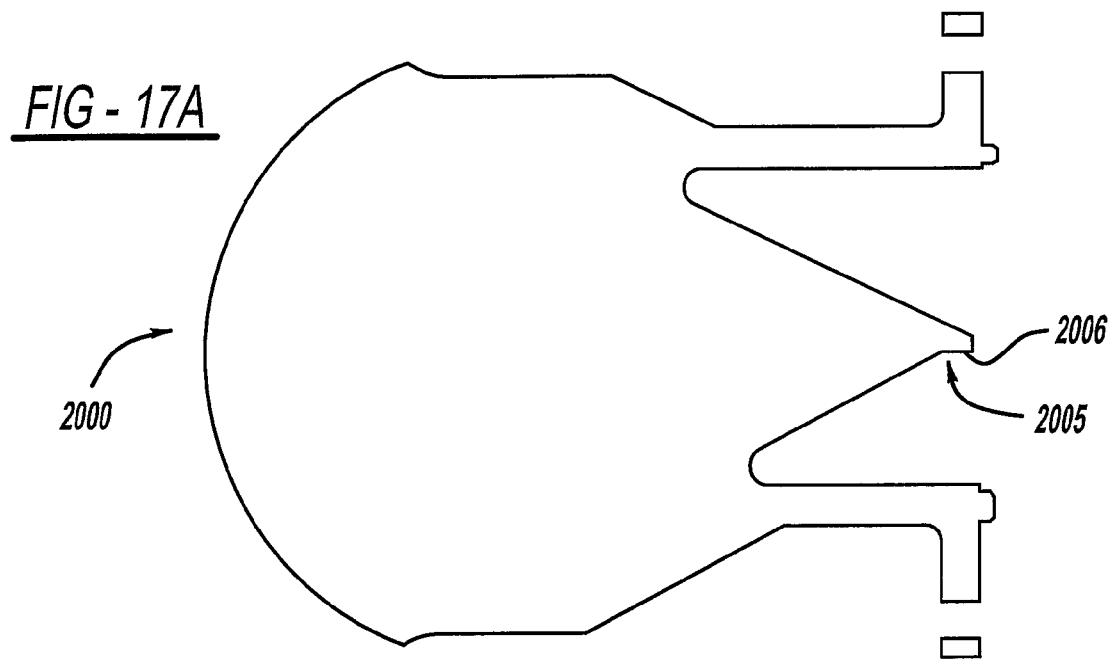
FIG. 17A is a sectional side view taken along lines 17A-17A of FIG. 16B.
Figure 17B:
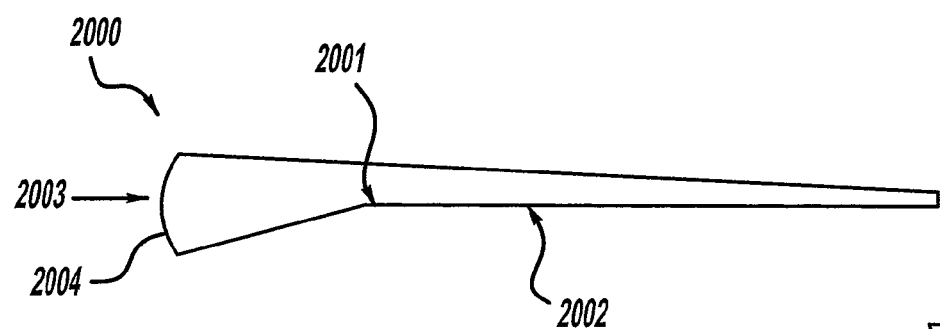
FIG. 17B is a sectional top view taken along lines 17B-17B of FIG. 16B.
Figure 17C:
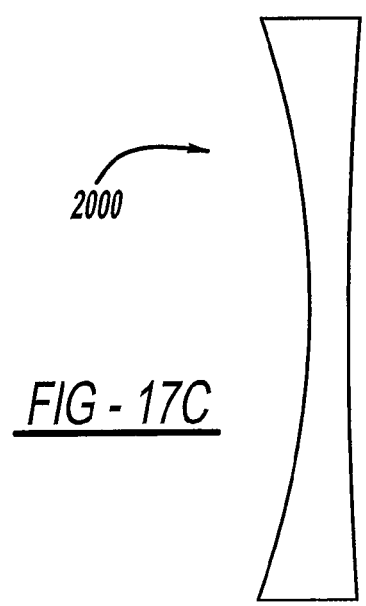
FIG. 17C is a sectional front view taken along lines 17C-17C of FIG. 16B.

FIGS. 13A through 14C show another embodiment of the present invention in the form of a bending/low beam optic, shown generally at 1700, which uses a similar approach used with regard to the high beam hot spot optic 1410 to achieve the higher intensity necessary for the hot spot used with a low beam. The optic height 1704 of the optic 1700 is larger, once again increased to 66 mm, and the thickness 1705 is again increased to be 10 mm thick. A notch 1701 and wall 1702 features are used in a similar manner to what was used on the spread optics 10,910. The optic 1700 also includes a first lower wall portion 1706 and a second lower wall portion 1707. The first lower wall portion 1706 is hyperbolic in shape, similar to that in the high beam hotspot optic 1410. The second lower wall portion 1707 is substantially flat, and has no effect on optical performance. The resulting optical pattern is shown in FIG. 15. The pattern shown in FIG. 18 is also ideal for being used in bending light generation by angling the optic 1700 off-axis to the left and right.

Figure 18:
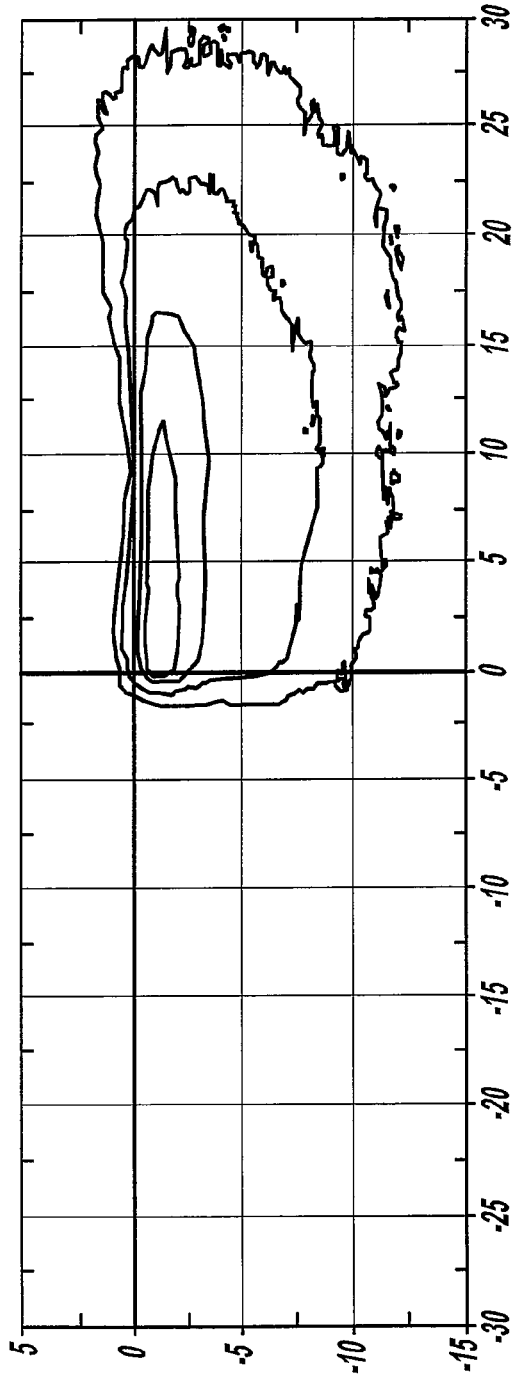
FIG. 18 is a beam pattern produced by an optic, according to a fifth embodiment of the present invention.
Figure 19:
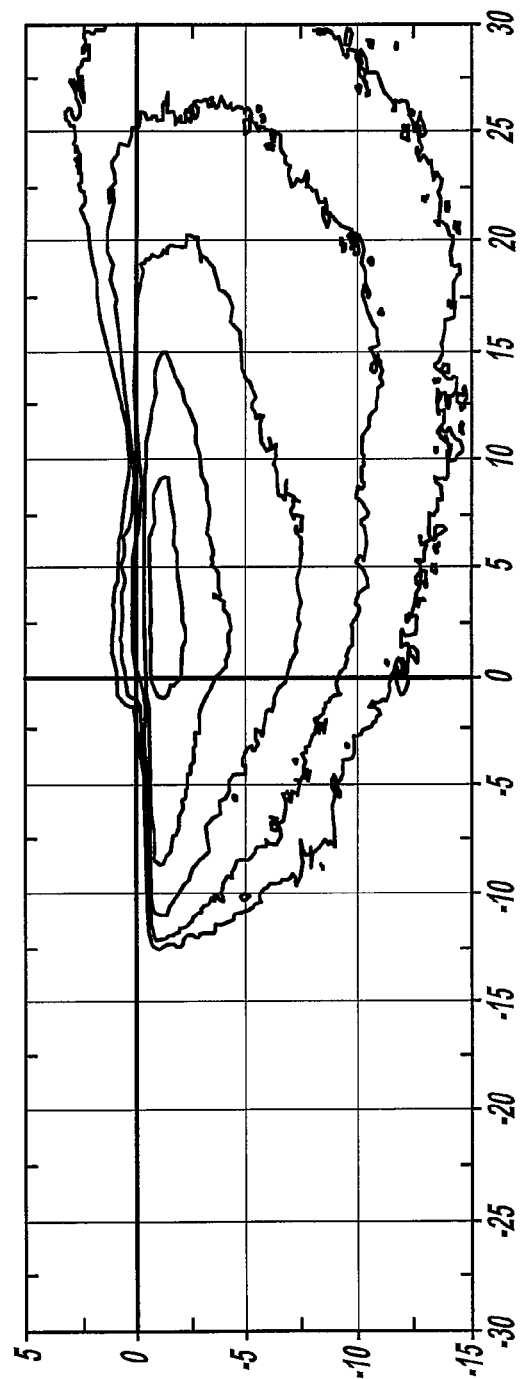
FIG. 19 is a beam pattern produced by the combination of a fourth and fifth embodiment of an optic, according to the present invention.
Figure 20A:
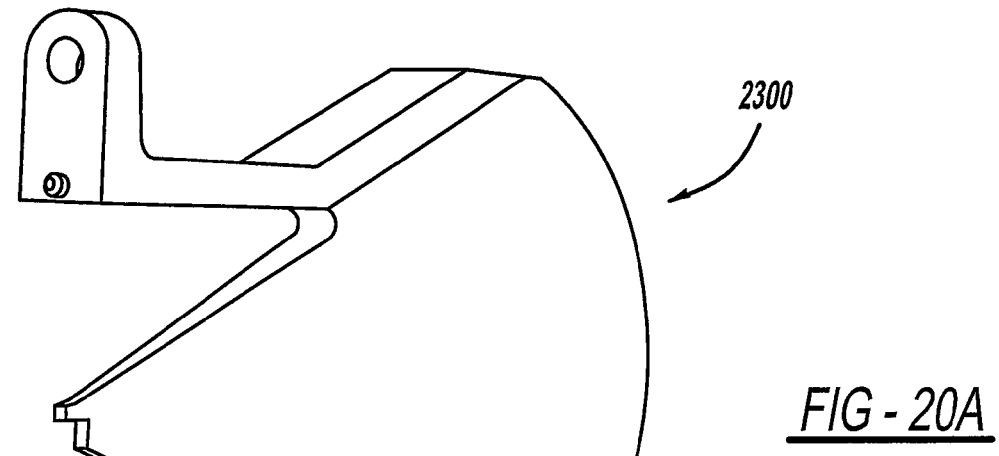
FIG. 20A is a first perspective view of an optic, according to a sixth embodiment of the present invention.
Figure 20B:
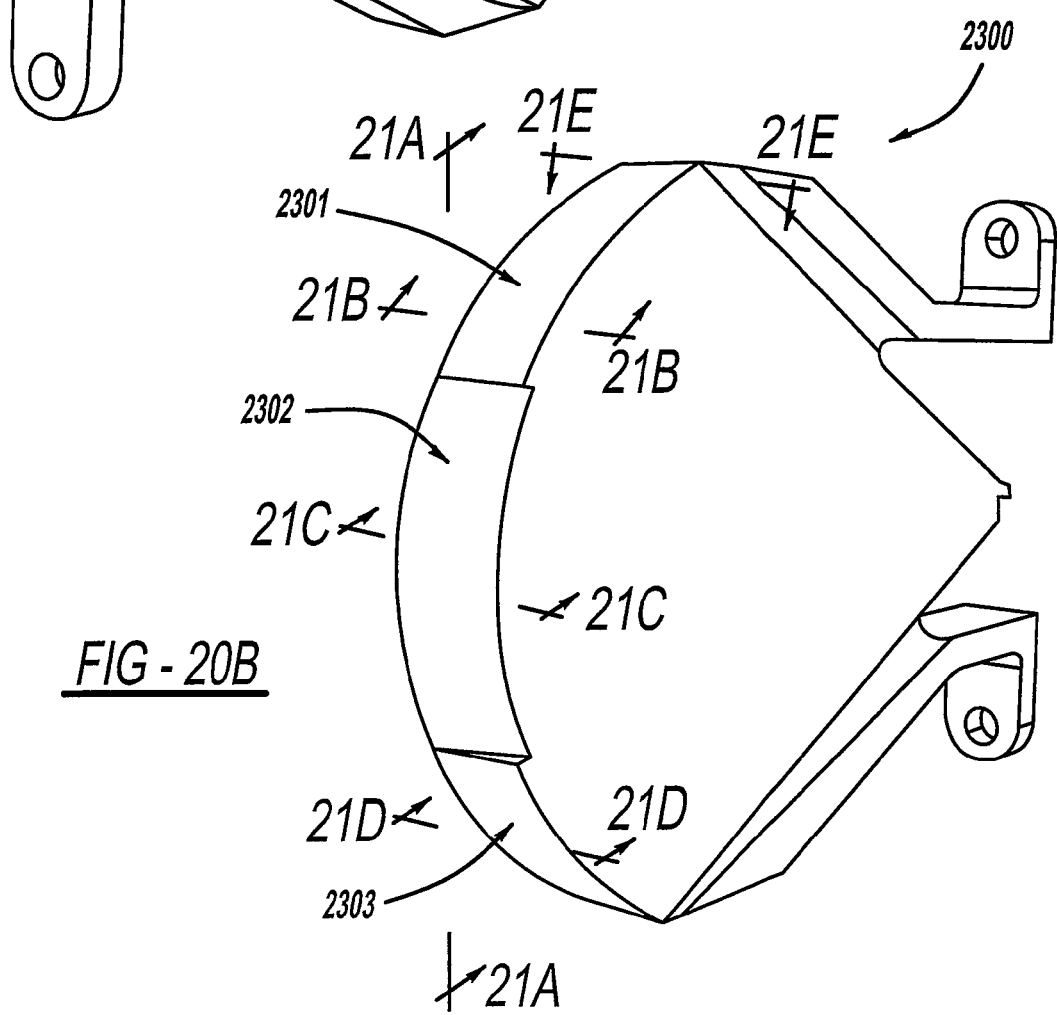
FIG. 20B is a second perspective view of an optic, according to a sixth embodiment of the present invention.

FIGS. 16A through 17C show another embodiment of the present invention in the form of the construction of an optic, shown generally at 2000, that also creates a beam pattern as shown in FIG. 18. When combined with the previously described optic 1700, the resulting pattern is that of a complete low beam hot spot, shown in FIG. 19. The light in the test point area 1418 has been reduced or eliminated. Combining the optic 1700 and the optic 2000 in FIGS. 13A-14C and 16A-17C incorporates three new features to achieve the desired output. Previously disclosed features of the optic 1700 are employed to create the vertical cutoff, i.e. the notch 2005 and wall 2006. The horizontal cutoff is achieved by applying a second notch 2001 and wall 2002 feature ninety degrees to the first at a different scale in the horizontal direction. A focusing shape 2003 is also applied to the output surface 2004.

Figure 22:
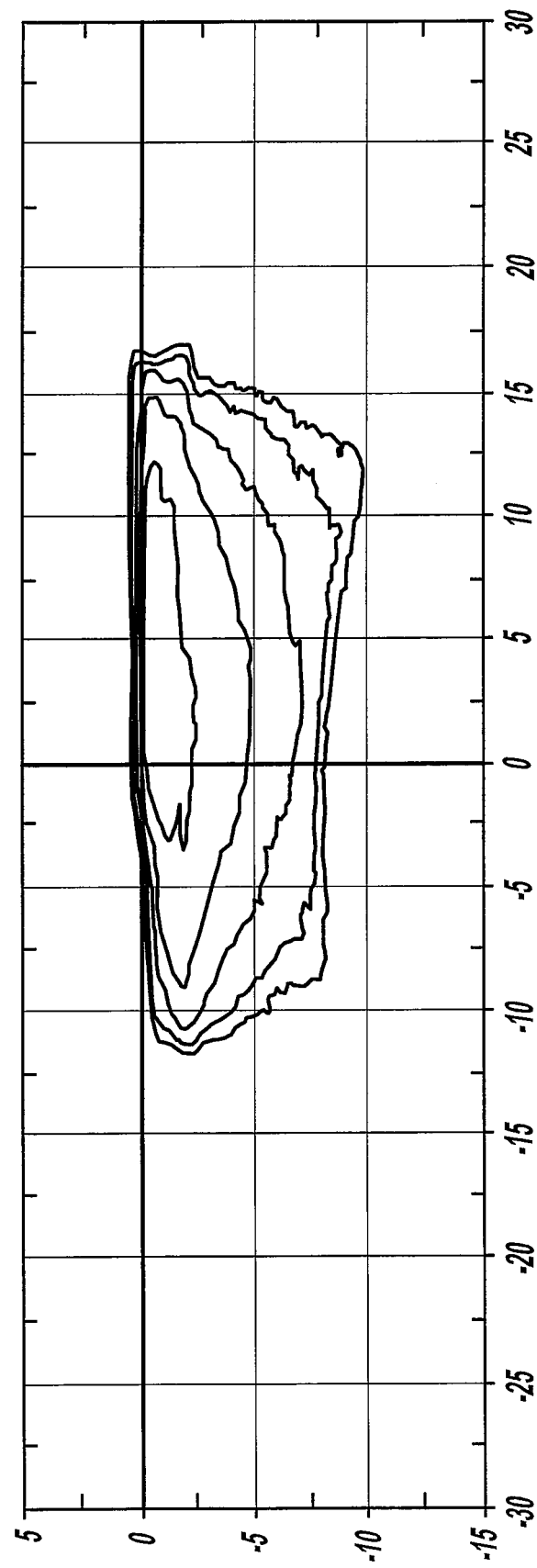
FIG. 22 is a beam pattern produced by an optic, according to a sixth embodiment of the present invention.
Figure 23A:
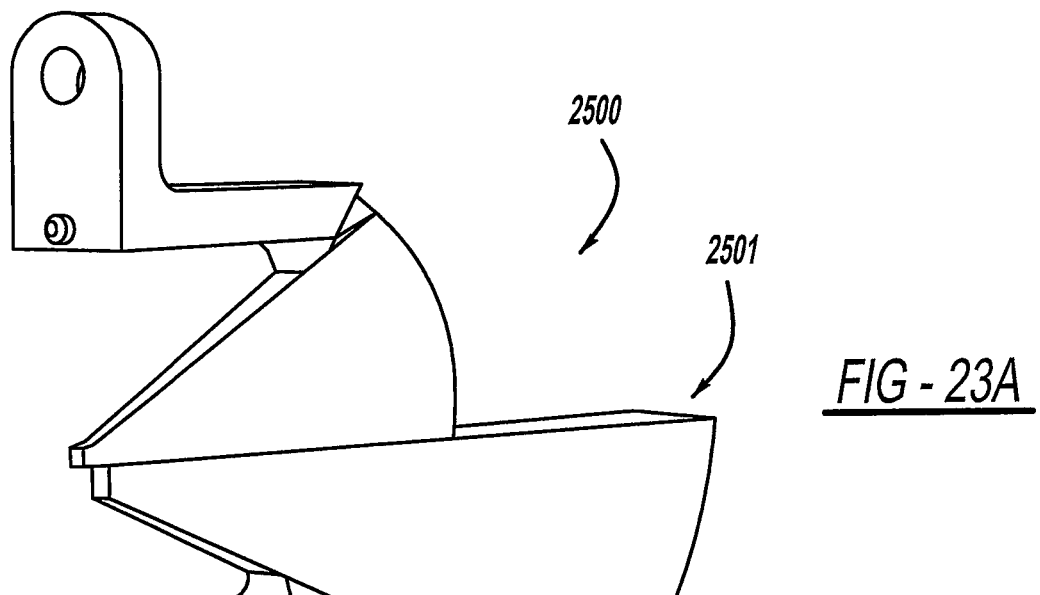
FIG. 23A is a first perspective view of an optic, according to a seventh embodiment of the present invention.
Figure 23B:
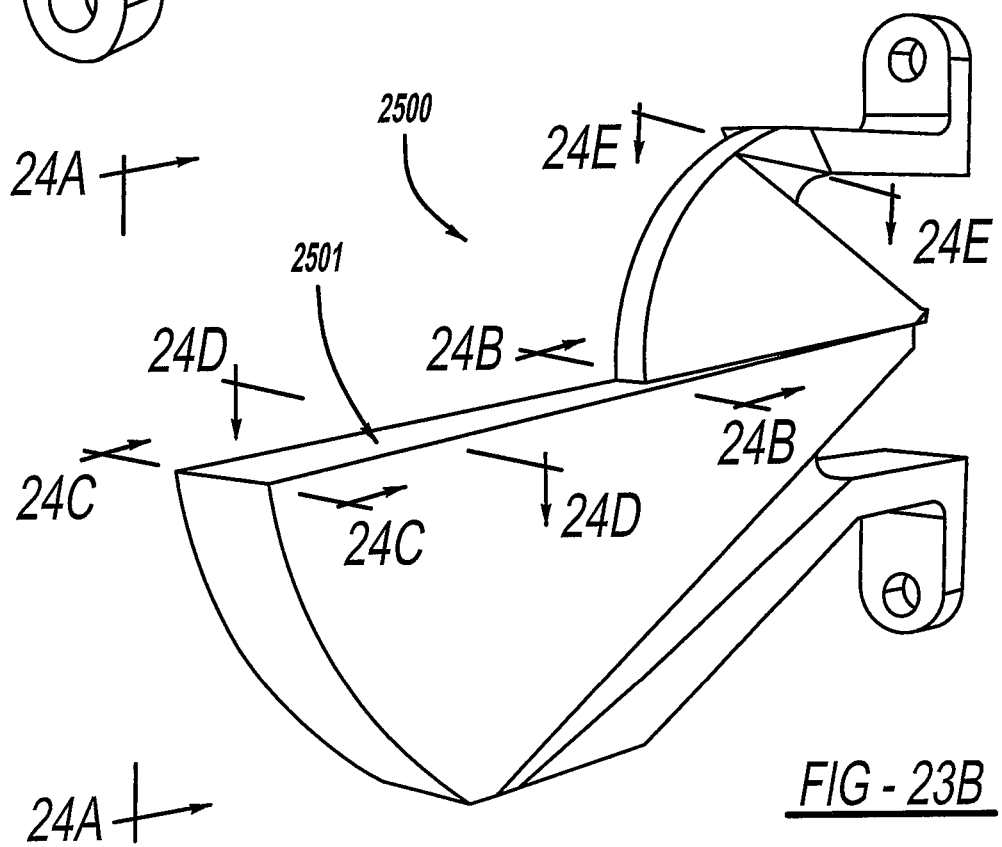
FIG. 23B is a second perspective view of an optic, according to a seventh embodiment of the present invention.

FIG. 20A through 21E show the construction of another embodiment of the invention in the form of an optic, shown generally at 2300, that achieves a similar output to that of the combined output of the previous two optics 1700,2000. This performance is achieved by sectioning the optic 2300 along various points of the output surface 2301 into multiple zones. Three zones are used in this embodiment, identified as a first zone 2301, a second 2302, and a third zone 2303, are taken along the sectioned areas of FIG. 20B. Each of these three zones 2301,2302,2303 have an independent sidewall 2401, 2403, 2405 and output shapes 2402, 2404, 2406, respectively, as shown in FIGS. 24B-24E. The resultant output of the optic 2300 is shown in FIG. 22. This optic 2300 produces higher optical efficiency.

Figure 25:
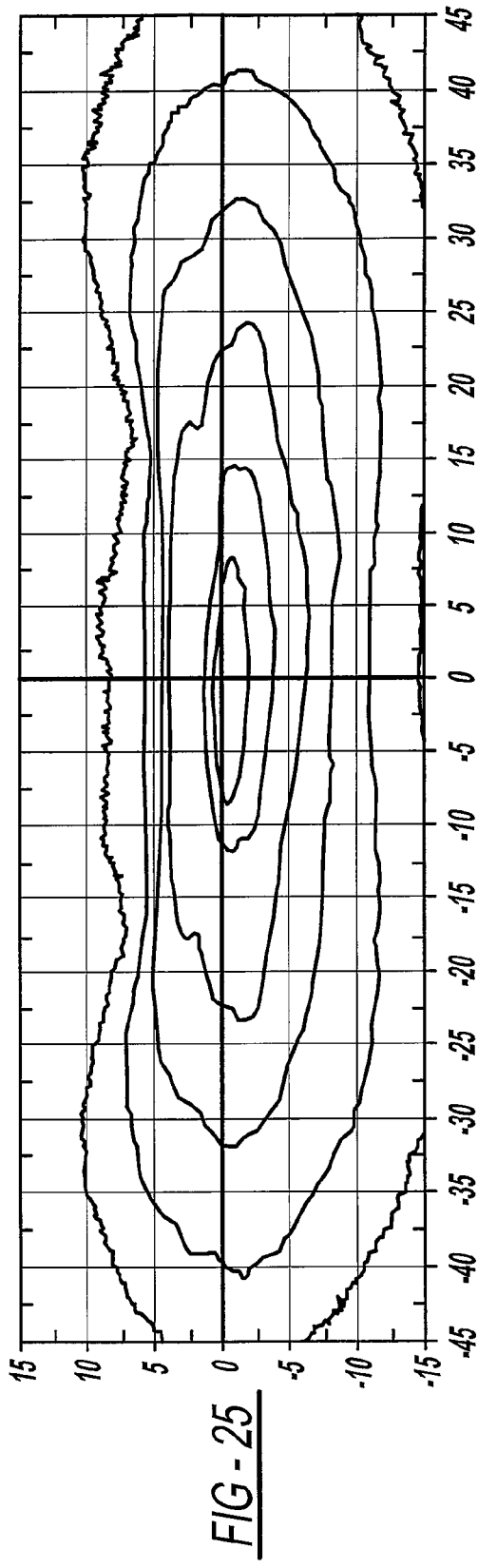
FIG. 25 is a low beam pattern produced by a seventh embodiment of an optic, according to the present invention.
Figure 26:
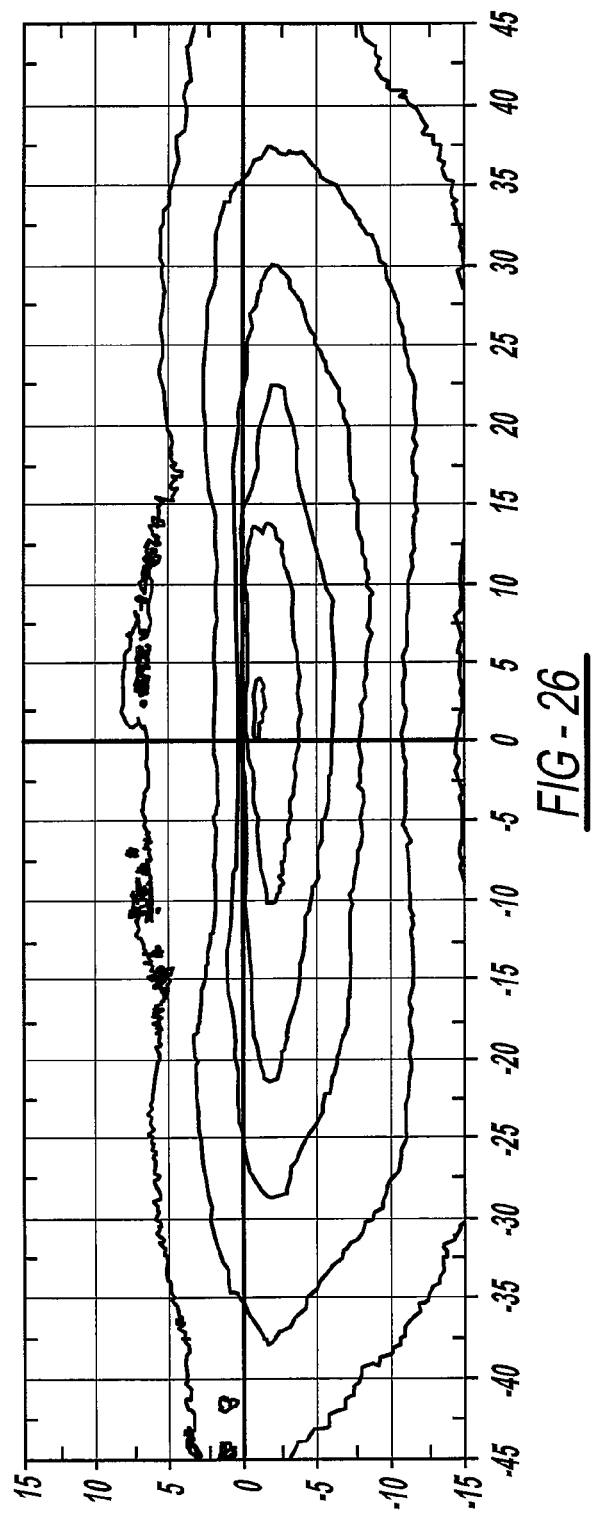
FIG. 26 is a beam pattern produced by a seventh embodiment of an optic, according to the present invention.

FIGS. 23A through 24E show an optic that can achieve a complete low beam pattern in a single part. The features of this optic 2500 provide both spread and hotspot functions. This is achieved by combining the smaller spread optic 10,910 with the larger hotspot optic 1410,1700. The size split must occur below approximately four degrees from horizontal 2502. The optic 2500 includes a smaller spread section 2503 and a larger hotspot section 2501, the larger hotspot section 2501 has a top portion 2502. There is a horizontal axis 2504 which divides the two sections 2501,2503. The top portion 2502 of the larger hotspot section 2501 descends at an angle 2505 below the horizontal axis 2504. The larger hotspot section 2501 may be broken into multiple sections similar to the optic 2300 previously described, each having an independent sidewall profile, output surface, and size configurations. FIG. 25 shows a high beam pattern from the optic 2500, and FIG. 26 shows a low beam pattern from the optic 2500.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An optic used for producing a desired beam pattern, comprising:
    a body portion formed by two opposing side surfaces;
    an input port integrally formed with the body portion and defining an input surface for receiving light from a light source, the input port includes a straight section where the two side walls are substantially parallel to each other and a tapered section where the two side walls taper inward towards each other from the straight section to the input surface, such that transition from the straight section to the tapered section is positioned in relation to the input port so as to control horizontal distribution of light emitted from the optic;
    an output surface integrally formed on the opposite side of said body portion in relation to said input port;
    a notch formed in the input port, where light is focused to form a smooth, blended foreground beam pattern of light produced by said optic;
    at least one leg portion formed as part of said body portion; and
    at least one alignment feature formed as part of said at least one leg portion, said at least one alignment feature for controlling the alignment of said optic in relation to said light source.

2. The optic used for producing a desired beam pattern of claim 1, said at least one alignment feature further comprising a plurality of alignment features, one of said plurality of alignment features providing control of the distance between said optic and said light source, and another of said plurality of alignment features used for controlling the alignment of said optic over said light source.

3. The optic used for producing a desired beam pattern of claim 1, further comprising:
    an aperture formed as part of said at least one leg portion; and
    a fastener extending through said at least one aperture, thereby securing said optic to a desired surface.

4. The optic used for producing a desired beam pattern of claim 1 wherein the input port protrudes from the body portion and has a shape of a triangular prism with its triangle faces truncated to form the input surface.

5. An optic used for creating a desired beam pattern, comprising:
    a body portion formed by two opposing side surfaces;
    an input port integrally formed with the body portion and defining an input surface for receiving light from a light source, the input port includes a straight section where the two side walls are substantially parallel to each other and a tapered section where the two side walls taper inward towards each other from the straight section to the input surface, such that the transition from the straight section to the tapered section is positioned in relation to the input port so as to control horizontal distribution of light emitted from the optic;
    a first notch formed in the input port for providing a cutoff toward the top portion of said desired beam pattern; and
    an output surface integrally formed on the opposite side of said body portion in relation to said input port.

6. The optic used for creating a desired beam pattern of claim 5, said optic having a second notch inverted in relation to said first notch for providing a cutoff toward the bottom portion of said desired beam pattern.

7. The optic used for creating a desired beam pattern of claim 5, said side wall profile further comprises a narrow portion, said narrow portion providing a flattening out of the outboard ends of said desired beam pattern.

8. The optic used for creating a desired beam pattern of claim 5, further comprising:
    at least one narrow wall portion formed as part of said body portion, said at least one narrow wall portion having at least one hyperbolic surface, increasing the intensity of said desired beam pattern.

9. The optic used for creating a desired beam pattern of claim 5, said at least one sidewall profile further comprising multiple sidewall profiles for shaping said desired beam pattern, wherein said multiple profiles are asymmetric with respect to one another.

10. The optic used for creating a desired beam pattern of claim 5, further comprising:
    a second notch; and
    a side wall profile, said second notch and said side wall profile rotated ninety degrees in relation to said at least one side wall profile and a horizontal output profile, thereby providing a focus at the location of said second notch.

11. The optic used for producing a desired beam pattern of claim 5 wherein the input port protrudes from the body portion and has a shape of a triangular prism with its triangle faces truncated to form the input surface.

12. The optic used for producing a desired beam pattern of claim 5 wherein the output surface emitting light entering the input port and having two or more grooves formed therein and extending substantially along the length of the output surface.

13. An optic for creating a desired beam pattern, comprising:
- a body portion having two opposing side surfaces;
- an input port integrally formed with said body portion, the input port includes an input surface configured to receive light from a light source and a portion of the two side walls tapered inwards toward the input surface;
- an output surface integrally formed with said body portion such that light enters into said optic through said input port, passes through said body portion, and exits said body portion through said output surface, the output surface having two or more grooves extending substantially along the length of the output surface;
- a first notch formed in the input port where light is focused to form a smooth, blended foreground beam pattern of light produced by said optic;
- at least one leg portion integrally formed as part of said body portion; and
- at least one alignment feature integrally formed with said at least one leg portion such that said at least one alignment feature provides proper spacing of said input port in relation to said light source.

14. The optic for creating a desired beam pattern of claim 13, further comprising:
- said first notch formed as part of said body portion in proximity to said input port; and
- a blending wall formed as part of said body portion in proximity to said input port and said first notch such that said blending wall and said first notch form at least a portion of a foreground portion of said desired beam pattern.

15. The optic for creating a desired beam pattern of claim 14, further comprising a second notch formed in the input port for providing a horizontal cutoff portion of said desired beam pattern.

16. The optic for creating a desired beam pattern of claim 13 wherein the input port protrudes from the body portion and has a shape of a triangular prism with its triangle faces truncated to form the input surface.

* * * * *